(12) United States Patent
Parakulam et al.

(10) Patent No.: US 6,407,550 B1
(45) Date of Patent: Jun. 18, 2002

(54) LINE LOCATOR WITH ACCURATE HORIZONTAL DISPLACEMENT DETECTION

(75) Inventors: Gopalakrishnan R. Parakulam, Sunnyvale; Stevan Polak, Aptos, both of CA (US)

(73) Assignee: Metrotech Corporation, Sunnyvale, CA (US)

( * ) Notice: Subject to any disclaimer, the term of this patent is extended or adjusted under 35 U.S.C. 154(b) by 0 days.

(21) Appl. No.: 09/136,767

(22) Filed: Aug. 19, 1998

(51) Int. Cl.$^7$ ................................................. G01V 3/10
(52) U.S. Cl. ..................................................... 324/326
(58) Field of Search ........................... 324/67, 72, 133, 324/326, 327, 335, 247; 343/893; 342/465

(56) References Cited

U.S. PATENT DOCUMENTS

| | | | |
|---|---|---|---|
| 2,105,247 A | 1/1938 | Jakosky | 324/363 |
| 3,617,865 A * | 11/1971 | Hakata | 324/326 |
| 3,707,002 A | 12/1972 | Howell | 346/33 M |
| 3,893,025 A * | 7/1975 | Humphreys, Jr. | 324/67 |
| 4,006,445 A | 2/1977 | Howell | 367/51 |
| 4,134,061 A | 1/1979 | Gudgel | 324/559 |
| 4,151,458 A | 4/1979 | Seager | 324/357 |
| 4,220,913 A | 9/1980 | Howell et al. | 324/529 |
| 4,387,340 A | 6/1983 | Peterman | 324/326 |
| 4,390,836 A * | 6/1983 | Bruce et al. | 324/326 |
| 4,427,942 A * | 1/1984 | Sole | 324/326 |
| 4,520,317 A | 5/1985 | Peterman | 324/326 |
| 4,542,344 A | 9/1985 | Darilek et al. | 324/326 |
| 4,639,674 A | 1/1987 | Rippingale | 324/326 |
| 4,659,989 A | 4/1987 | Kerr | 324/233 |
| 4,806,869 A | 2/1989 | Chau et al. | 324/326 |
| 4,864,293 A | 9/1989 | Chau | 340/856 |
| 4,990,850 A | 2/1991 | Votruba | 324/225 |
| 5,001,430 A | 3/1991 | Peterman et al. | 324/326 |
| 5,014,008 A | 5/1991 | Flowerdew | 324/326 |
| 5,043,666 A | 8/1991 | Tavernetti et al. | 324/326 |
| 5,065,098 A * | 11/1991 | Salsman et al. | 324/326 |
| 5,133,417 A | 7/1992 | Rider | 375/368 |
| 5,194,812 A * | 3/1993 | Yokoi | 324/326 |
| 5,210,497 A | 5/1993 | Regini | 324/521 |
| 5,210,498 A | 5/1993 | Paananen | 324/529 |
| 5,231,355 A | 7/1993 | Rider et al. | 324/326 |
| 5,260,659 A | 11/1993 | Flowerdew et al. | 324/326 |
| 5,264,795 A | 11/1993 | Rider | 324/326 |
| 5,339,456 A | 8/1994 | Dickerson | 455/303 |
| 5,355,533 A | 10/1994 | Dickerson | 455/306 |
| 5,361,029 A | 11/1994 | Rider et al. | 324/326 |
| 5,430,379 A | 7/1995 | Parkinson et al. | 324/329 |
| 5,670,882 A * | 9/1997 | Brandolino et al. | 324/345 |
| 5,773,971 A * | 6/1998 | Tavernetti | 324/326 |

FOREIGN PATENT DOCUMENTS

| | | |
|---|---|---|
| EP | 0 388 041 B1 | 2/1990 |
| JP | 2-36390 * | 2/1990 |

* cited by examiner

*Primary Examiner*—Jay Patidar
(74) *Attorney, Agent, or Firm*—Skjerven Morrill MacPherson LLP; Gary J. Edwards

(57) ABSTRACT

A line locator having the capability of determining the horizontal position with respect to a line is described. The line locator includes a left sensor and a right sensor of any orientation. The left sensor and the right sensor are coupled to a convolution amplifier that amplifies the sum of the output signals from the left sensor and the right sensor. The detection circuitry includes automatic gain control amplification where the automatic gain control signal is obtained digitally from a digital controller. In addition, the detection circuitry includes phase detection circuitry where the phase reference signal is obtained from an external transmitter that is coupled to the line. In addition, the AGC signal and the phase reference signal may both be obtained by processing output signals from magnetic field detectors in the line locator.

26 Claims, 32 Drawing Sheets

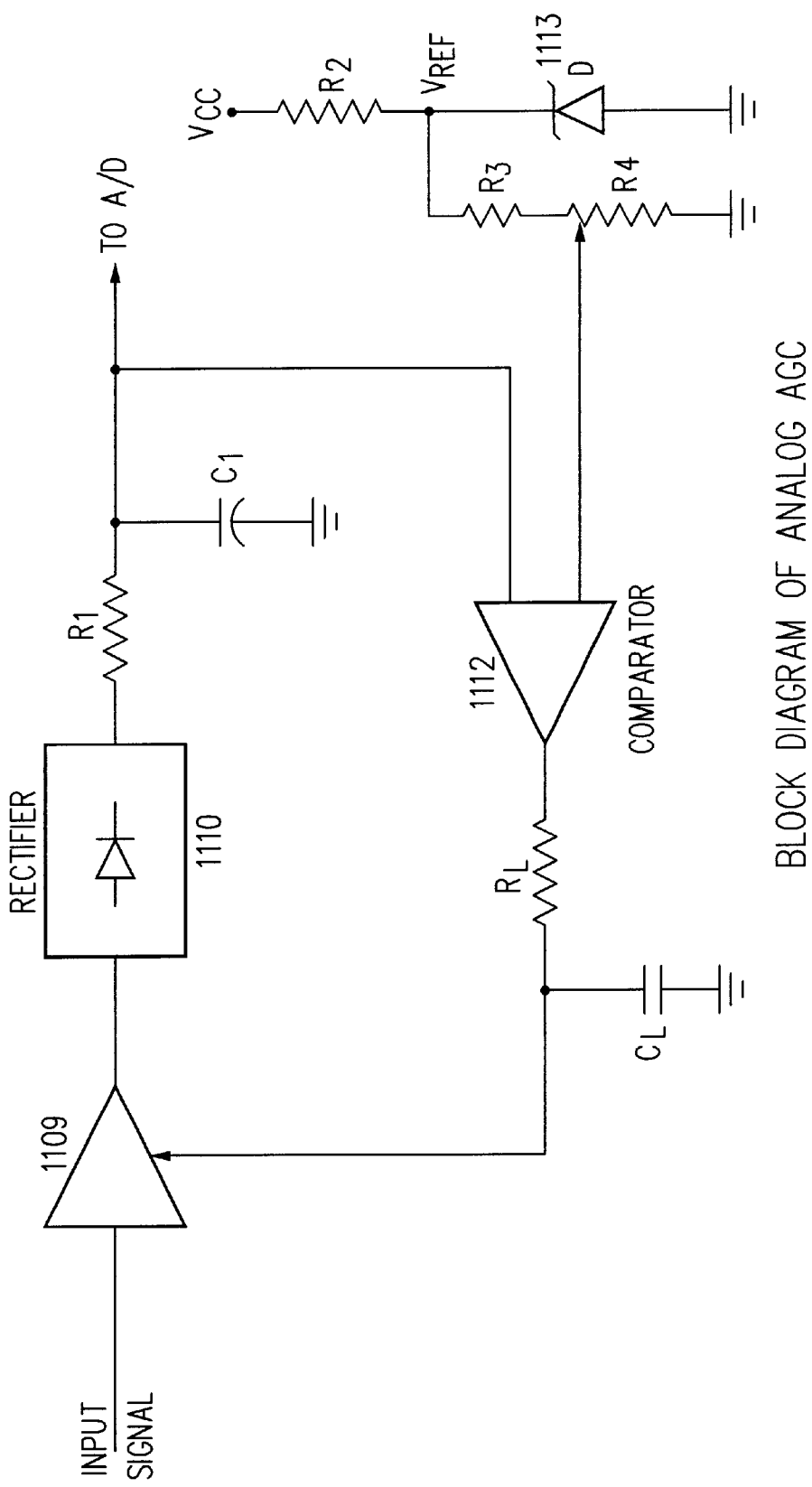
FIG. 11B  BLOCK DIAGRAM OF ANALOG AGC

AGC

ACTIVE/PASSIVE SWITCH

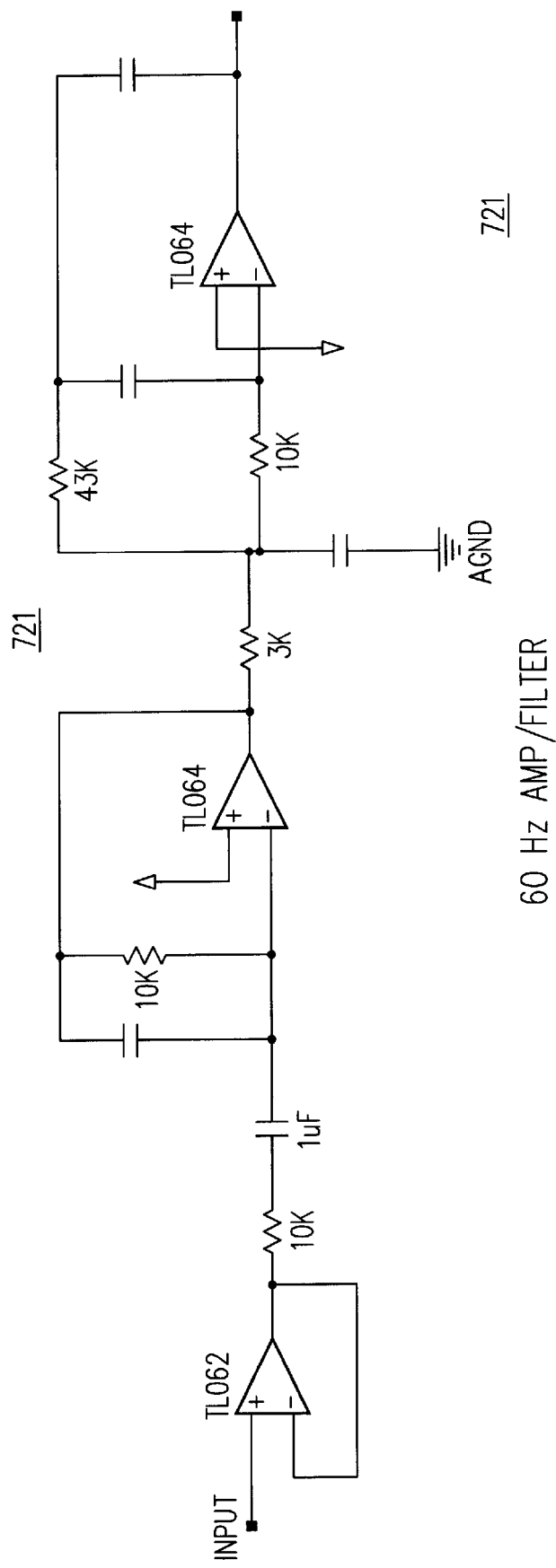
FIG. 12F  60 Hz AMP/FILTER

IF AMP + FILTER

PHASE DETECTOR

PHASE REFERENCE

LINE LOCATOR WITH ACCURATE HORIZONTAL DISPLACEMENT DETECTION

CROSS REFERENCE TO RELATED APPLICATION

This application is related to U.S. Pat. No. 6,130,539, "Automatic Gain Control for Line Locator", Steven Polak, filed on the same date as the present application and herein incorporated by reference in its entirety.

CROSS REFERENCE TO MICROFICHE APPENDIX

Appendix A, which is a part of the present disclosure, is a microfiche appendix consisting of 5 sheets of microfiche having 400 frames. Microfiche appendix A includes a software program operable in a microprocessor controller of a left/right line locator as described below.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

This and other embodiments are further described below.

BACKGROUND

1. Field of the Invention

The invention relates to a line locator for locating concealed conductors and, more specifically, to line locators having the capability of determining the lateral location of the line locator relative to the concealed conductor.

2. Background

It is often necessary to locate buried conduits, which are employed by numerous utility companies, in order to repair or replace them. In addition, it is important to locate conduit lines in order not to disturb them when excavating for other purposes (such as, for example, addition of new conduits). Examples of buried conduits include pipelines for water, gas or sewage and cables for telephone, power or television. Many of the conduits are conductors, such as metallic pipelines or cables. In other applications, it is often useful to locate concealed elongated conductors, such as power lines or copper water lines, concealed in the walls of buildings. It is well known to locate concealed elongated conductors ("lines") by detecting electromagnetic emissions from them.

A conducting conduit (a line) may be induced to radiate electromagnetically by being directly connected to an external transmitter or by being inductively coupled to an external transmitter. In some instances, such as with power lines, the line may radiate without an external transmitter.

A line locator detects the electromagnetic radiation emanating from the line. Early line locators included a single sensor that detects a maximum signal or a minimum signal, depending on the orientation of the sensor, when the line locator is passed over the line. Later line locators have included two sensors to provide information regarding proximity to the line.

FIG. 1 shows a line 4, beneath surface 7, that is radiating a magnetic field 5. Magnetic field 5 is generally directed in a circular fashion around line 4. Line locator 1 is held by operator 6 over line 4. Line locator 1 includes sensor 3 that detects magnetic field 5 and displays a signal on a display 2 that is indicative of the magnetic field strength at sensor 3. Depending on the orientation of sensor 3 (i.e., whether it is sensitive to horizontal or vertical components of the magnetic field), display 2 will indicate a maximum signal or a minimum signal when line locator 1 is held directly above line 4 (where the magnetic field 5 is directed horizontally).

For purposes of this description, a horizontal magnetic field refers to a magnetic field directed parallel with surface 7, even if surface 7 happens to be a wall. A vertical magnetic field refers to a magnetic field that is directed perpendicular to surface 7. Similarly, a horizontally oriented sensor is arranged to detect horizontal components of the magnetic field while a vertically oriented sensor is arranged to detect vertical components of the magnetic field.

FIG. 2A shows a line locator 200 having a left sensor 201, a right sensor 202, and a center sensor 203, each of the sensors being vertically oriented. Left sensor 201 and right sensor 202 are positioned at equal elevation above surface 7 and have substantially identical responses to magnetic fields. Center sensor 203 is disposed equidistant from left sensor 201 and right sensor 202 and can have an elevation above surface 7 that is different from the elevation of left sensor 201 and right sensor 202. Center sensor 203 is a compensating field sensor that is used to correct for ambient magnetic fields (i.e., magnetic fields that do not originate from line 4) in the vicinity of left sensor 201 and right sensor 202. As indicated by the dots drawn adjacent each sensor, center sensor 203 is arranged such that, given the same magnetic field, the output signals from center sensor 203 will have the opposite polarity of the output signals from left sensor 201 and right sensor 202.

In general, a transmitter 205 is electrically coupled to line 4 so that line 4 will radiate with a frequency determined by transmitter 205. Line locator 200 is capable of detecting whether line 4 is to the left or the right of center sensor 203 by comparing the magnetic field 5 at left sensor 201 with the magnetic field 5 at right sensor 202. U.S. Pat. No. 4,639,674, entitled "Apparatus and Method Employing Extraneous Field Compensation for Locating Current-Carrying Objects," issued Jan. 27, 1987, to Rippingale, describes such a line locator.

FIG. 2B shows detection circuitry for line locator 200 of FIG. 2A. The output signal from center sensor 203 is added to each of the output signals from left sensor 201 and right sensor 202 such that a correction is made for ambient magnetic fields not associated with line 4 (see FIG. 2A). The corrected output signal from left sensor 201 is processed through a channel comprising, in series, a pre-amplifier 204, a mixer 205, an IF filter/amplifier 207, and a phase detector 210. The corrected output signal from right sensor 202 is processed through a substantially identical channel.

In each channel, mixer 205 combines the output signals from pre-amplifier 204 with a LO FREQ signal from local oscillator 206. The LO FREQ signal is the frequency of transmitter 205 (see FIG. 2A) plus a center frequency. IF Filter 207 is a band pass filter and amplifier that passes signals at the center frequency. The combination of mixer 205 and IF filter 207 provides some filtering of the signal being processed through each channel. The gain of IF filter 207 is set by set-point 208.

The phase reference for phase detectors 210 is determined from the channel containing left sensor 201 by phase-lock-loop 209. The output signals from the two channels are summed, after being independently processed, in adder 211. The output signal from adder 211 is the left/right signal. The polarity of the left/right signal indicates whether center sensor 203 is laterally displaced to the left or right of line 4.

This method of line detection, however, is subject to phase instability. Because of the difficulty inherent in insuring that the output signals from left sensor 201 and right sensor 202 remain comparable over the full range of input signal strength, as is required by this method of signal processing, little signal filtering can be accomplished in the two channels. Additionally, because the phase reference is determined using the output signal from left sensor 201, line locator 200 is incapable of left/right location if left sensor 201 and right sensor 202 are both displaced to one side of line 4 where the output signals from both sensors have the same polarity.

Other line locators, such as U.S. Pat. No. 5,001,430 to Peterman et al., having a left/right detection capability include a left sensor, a right sensor and a central sensor where the left sensor and the right sensor have an orientation of between 0° and 90° from the horizontal, but specifically not 0° or 90°. In addition, because the left sensor and the right sensor detect magnetic fields having the same polarities (i.e., primarily the horizontal component of the magnetic field), the output signal used in the circuitry is a difference signal between the magnetic field measured at the left sensor and the magnetic field measured at the right sensor. As a result, the output signal of the left/right detector is typically small and difficult to process.

There remains a need for a line locator having reliable lateral position indication (i.e., indication of which side of the line that the locator is positioned). In addition, there is a need for a line locator having horizontal position indication along with the capability of indicating the depth of the line. Finally, there is a need for a line locator having the capability of displaying a calibrated distance corresponding to an amount that the line locator is translated from the line (as opposed to simply indicating which side of the line the locator is positioned).

SUMMARY

Accordingly, a line locator having the capability of indicating whether the line locator is to the left of a line or to the right of the line is described. The output signal from a left sensor is convoluted with the output signal from a right sensor before filtering so that phase and amplitude information is not lost and further filtering of the convoluted output signal can be accomplished. The convoluted signal is processed through a single channel that relieves the necessity for accurate tracking of signals through separate channels.

In addition, phase detection is accomplished using a phase reference signal acquired from sources other than the left sensor or the right sensor. In some embodiments, the phase reference signal can be acquired from a transmitter that is being used to excite the line. The transmitter can be electrically coupled to the line locator by any convenient method, including direct electrical connection or wireless communication. In addition, the line may be utilized as a transmitter antenna for wireless communication of a phase reference signal. In other embodiments, the phase reference signal is generated using a magnetic field sensor not associated with the left/right locator sensors. For example, another horizontally oriented sensor, where the output signal from the sensor does not change polarity when passed over the line, can be used to generate the phase reference signal.

Although the left sensor and the right sensor can have any orientation, orientations of the left sensor and the right sensor that lie directly along the magnetic field orientation will provide the maximum output signals. Signal processing circuitry compares the output signal of the left sensor and the output signal of the right sensor in order to determine the lateral position of the line locator relative to the line. The comparison of the output signals include convoluting the output signal from the left sensor with the output signal from the right sensor.

Convolutions of the two output signals include taking their sum or their difference. Output signals from the left and right sensors may also be convoluted in other fashions in order to analyze the lateral position. The actual convolution is dependent on the orientation of the sensors. If the sensors are vertically oriented, for example, then a convenient and useful convolution function is an addition.

Some embodiments of the line locator include a field sensor. The processing circuit that includes the field sensor provides a phase reference to the signal processing circuitry and may provide other signals such as an AGC signal. Some embodiments of the invention include two center sensors, one located directly above the other, so that the line locator can determine the depth of the line and, from the depth, determine actual calibrated lateral position of the line locator position relative to the line.

Several embodiments of the invention are discussed below with reference to the following figures.

BRIEF DESCRIPTION OF THE FIGURES

FIG. 11B shows a circuit for analog generation of the AGC signal.

In the figures, elements having the same or similar functions have the same identifiers.

DETAILED DESCRIPTION OF THE INVENTION

Figure 3:
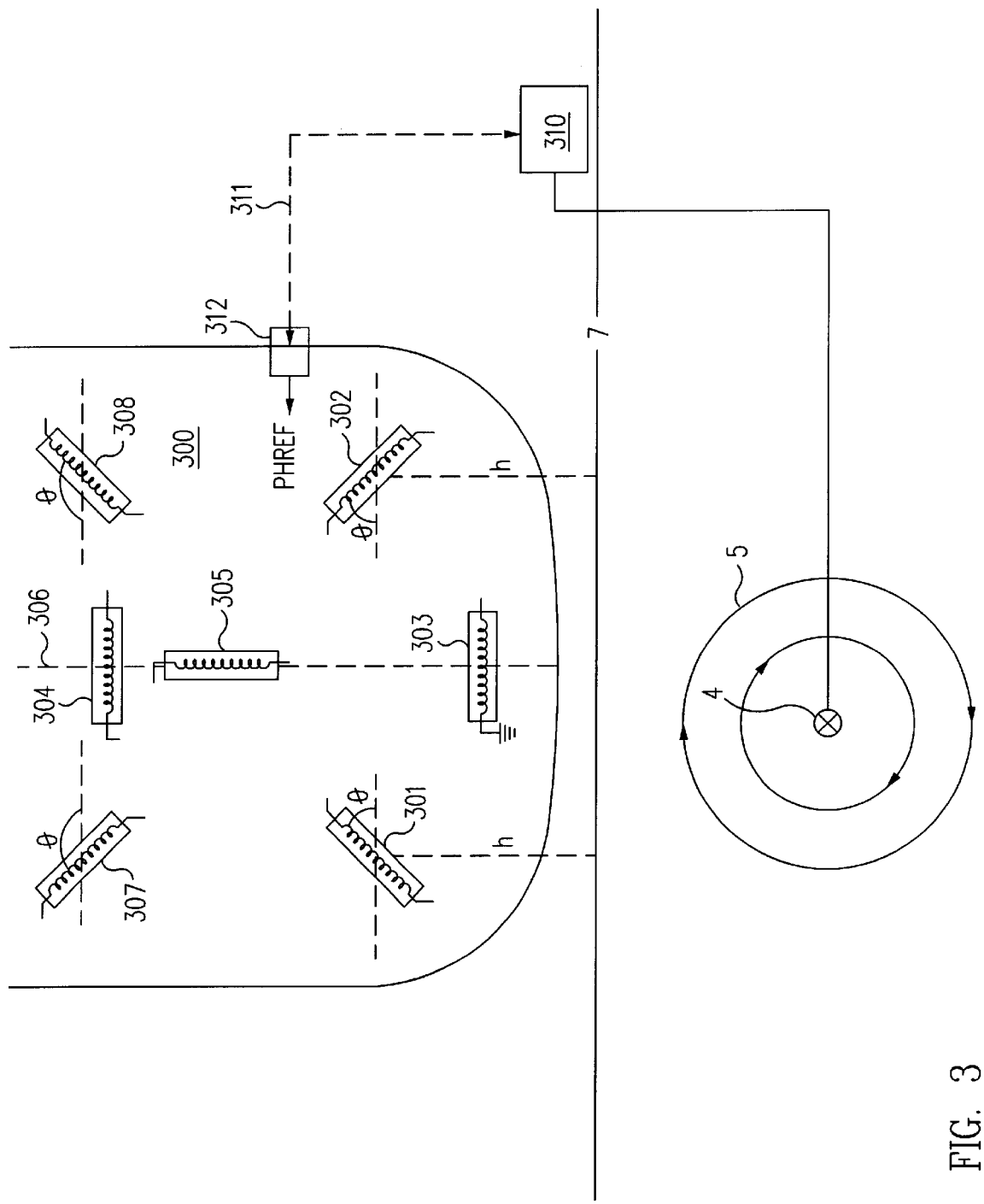
FIG. 3 shows a block diagram of a line locator according to the present invention.

FIG. 3 shows a line locator 300 according to the present invention. Line locator 300 includes a left sensor 301 and a right sensor 302 that provide output signals for detecting the lateral position of line locator 300 with respect to line 4. Line 4 carries a current having a particular frequency and therefore produces time-varying magnetic fields, which are detected by left sensor 301 and right sensor 302. The current can be induced in line 4 by a transmitter 310 that is electrically coupled, directly or inductively, to line 4. In some applications, line 4 may carry signals having particular frequencies (such as a 50 or 60 Hz power line) and therefore does not require a transmitter in order to emit a time-varying magnetic field.

Additionally, line locator 300 includes a source for a phase reference (PHREF) signal. In FIG. 3, one possible source for the PHREF signal is transmitter 310. Transmitter 310 can be coupled to a receiver terminal 312 in line locator 300 by transmission medium 311. Transmission medium 311 may be a direct electrical connection (i.e., a cable) or a wireless transmission medium. Other possible sources for the PHREF signal includes any sensor not associated with left/right positioning.

Line locator 300 can include a bottom sensor 303 and a top sensor 304 that can be used to provide a PHREF signal. In addition, bottom sensor 303 and top sensor 304 can provide output signals to independently detect whether or not the line locator is positioned directly above line 4 and, together, to detect the distance between locator 300 and line 4. The top sensor 304 and the bottom sensor 303 in FIG. 3 are oriented horizontally and positioned in a center plane 306 of line locator 300 so that top sensor 304 is higher (with respect to surface 7) than bottom sensor 303. Center plane 306 is defined such that the horizontal orientation of top sensor 304 and bottom sensor 303 are perpendicular to the plane.

Left sensor 301 and right sensor 302 are arbitrarily oriented. In general, left sensor 301 and right sensor 302 need only be positioned such that they are not in center plane 306, a symmetrical positioning with respect to center plane 306 of line locator 300 (e.g., being equidistant from the plane), however, allows for simpler processing circuitry to analyze the output signals and arrive at meaningful results.

Line locator 300 can further include a field sensor 305. The output signal from field sensor 305 can be utilized to correct the output signals of other magnetic field sensors (such as left sensor 301, right sensor 302, t,p sensor 304, and bottom sensor 303) for the presence of ambient magnetic fields and may also be utilized to provide signals such as the AGC signal and the PHREF signal. Any of the magnetic field sensors in line locator 300 can be arbitrarily oriented. Also, line locator 300 may include any number of pairs of left sensor and right sensor, such as left sensor 307 and right sensor 308, as well as any number of individual sensors, each of which provide additional information for determining the position of line locator 300 with respect to line 4.

Any device capable of detecting a magnetic field, including sensor coils, Hall effect probes, flux-gate sensors, or any other device capable of detecting a magnetic field, can be used as a magnetic field sensor (i.e., left sensor 301, right sensor 302, bottom sensor 303, top sensor 304 and field sensor 305) in line locator 300. In most embodiments, the sensors comprise coils of wires wound about a bobbin. The center of the bobbin may contain a magnetic core. Sensor coils with no magnetic coils, i.e. air coils, are useful for high frequency applications but sensor coils having magnetic cores will provide higher sensitivity at lower frequencies.

In general, the magnetic field sensors are sensitive to the orientation of the magnetic field and detect components of the field that are directed along an orientation axis of the magnetic field sensor. A horizontally oriented sensor such as bottom sensor 303 as shown in FIG. 3, for example, detects fields that are horizontally directed with respect to surface 7 (which is any surface that conceals line 4).

In FIG. 3, left sensor 301 is oriented at an angle of θ from the horizontal. Similarly, right sensor 302 is oriented at an angle of 180°−θ from the horizontal. Alternatively, left sensor 301 and right sensor 302 can have separate orientations, i.e. left sensor 301 can have an orientation of $\theta_1$ and right sensor 302 can have an orientation of $\theta_2$. The orientation angle θ can range from 0° to 360°. For example, θ is 90° for vertically oriented sensors. In most embodiments, left sensor 301 and right sensor 302 are substantially identical sensors so that their responses to identical magnetic fields are substantially the same, although in certain embodiments left sensor 301 and right sensor 302 may have different responses to magnetic fields. In addition, in most embodiments left sensor 301 and right sensor 302 are positioned within line locator 300 so that the height (h) of these sensors from surface 7 is the same. Bottom sensor 303 is shown as being lower (i.e., closer to surface 7) than left sensor 301 and right sensor 302; however, in general, bottom sensor 303 may lie at any elevation from surface 7. Top sensor 304 generally is mounted within line locator 300 in center plane 306 and at a higher elevation than bottom sensor 303.

In addition, any number of other magnetic field sensors, such as field sensor 305, left sensor 307 and right sensor 308, can be included in line locator 300. Although all of the magnetic field sensors shown in FIG. 3 are shown as coil sensors, in general line locator 300 may include magnetic field sensors of differing types (such as Hall probes in combination with coil sensors).

Figure 4:
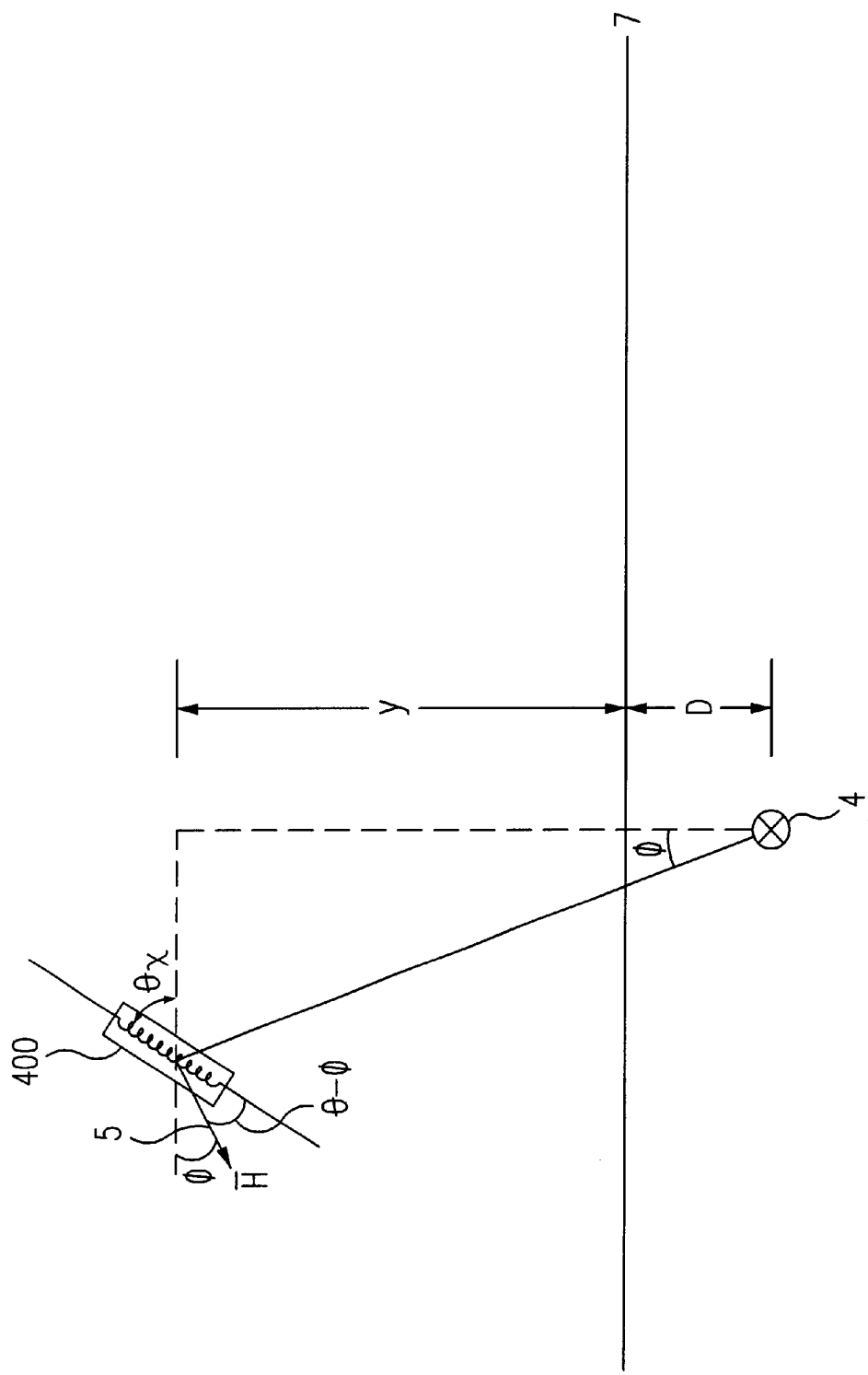
FIG. 4 shows a block diagram of a single, arbitrarily oriented, magnetic field sensor.

FIG. 4 shows a sensor 400 oriented at an angle θ from the horizontal. Sensor 400 may be any of the magnetic field sensors shown in FIG. 3 or may be any magnetic field sensor that is included in line locator 300. Sensor 400 is elevated to a distance y from surface 7 and laterally translated a distance x to the left of line 4. Line 4 is at a depth D below surface 7. The output signal from sensor 400 is proportional to the component of the magnetic field along the orientation direction of sensor 400 and inversely proportional to the distance between sensor 400 and line 4. Assuming that the physical dimensions of sensor 400 are small compared with the distance between sensor 400 and line 4, so that the magnetic field H does not vary significantly within sensor 400, then the output signal from sensor 400 is given by $$V = -(i\mu_o I \omega/2\pi)\alpha e^{-i\omega t} \cos(\varnothing-\theta)/(d^2+x^2)^{1/2}, \quad (1)$$

where I is the current in line 4, $\omega$ is the frequency of the current in line 4, $\varnothing$ is the angle between the vertical direction and a line connecting sensor 400 and line 4, $\mu_o$ is the magnetic susceptibility of free space and d=y+D. The parameter $\alpha$ is the response of the coil to a magnetic field and may also depend on the frequency and strength of the magnetic field. Defining $K=-(i\mu_o I\omega/2\pi)\alpha e^{-i\omega t}$, using the trigonometric identity that $\cos(\varnothing-\theta)=\cos\varnothing\cos\theta+\sin\varnothing\sin\theta$, and substituting geometrically for $\cos\varnothing$ and $\sin\varnothing$ indicates that the magnitude of the output signal from sensor 400 is given by $$V = [K/(d^2+x^2)] (d\cos\theta + x\sin\theta). \quad (2)$$

For a horizontally oriented sensor, $\theta=90°$, the magnitude of the output signal is $$V = Kd/(d^2+x^2). \quad (3)$$

For a vertically oriented sensor, $\theta=90°$, then the magnitude of the output signal is $$V = Kx/(d^2+x^2). \quad (4)$$

Note that, for vertically oriented sensors, the magnitude of the output signal changes polarity (i.e., changes sign) when sensor 400 passes over line 4 (i.e., x goes through 0) but there is no change in polarity when a horizontally oriented sensor passes through x=0.

Figure 5:
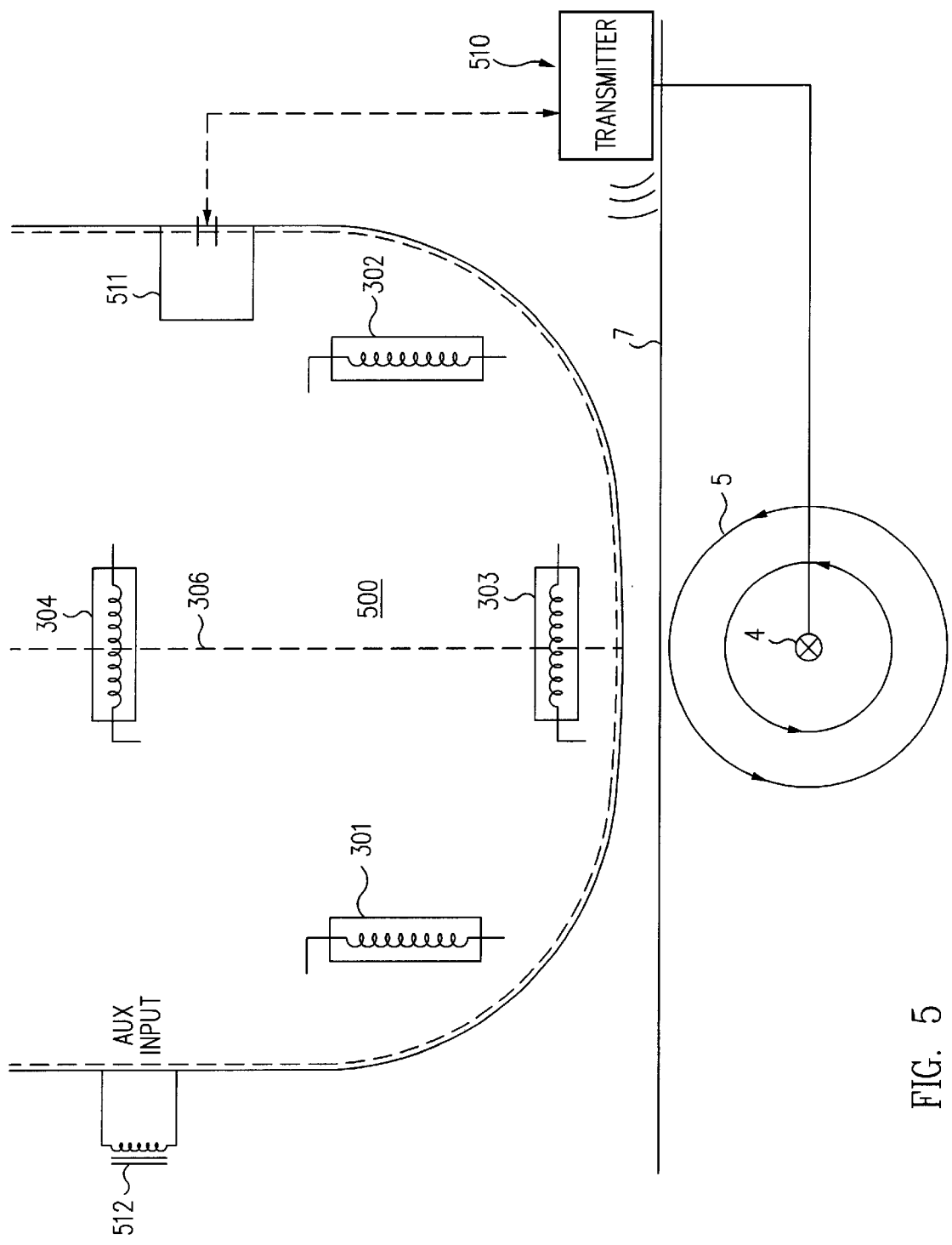
FIG. 5 shows a diagram of an embodiment of the line locator having a left sensor, a right sensor, a top sensor/and a bottom sensor.

FIG. 5 shows a line locator 500 according to one embodiment of the present invention. Line locator 500 includes at least a left sensor 301 and a right sensor 302 and a source for the PHREF signal. In FIG. 5, left sensor 301 and right sensor 302 are shown vertically oriented. In general, embodiments of line locator 500 may include any number of left and right sensors having any orientation. Left sensor 301 and right sensor 302 are symmetrically disposed about center plane 306 and are separated by any distance. Actual separation distance depends on the diameter of line 4 and the separation distance between the line locator 500 and line 4. A limitation on the minimum separation between sensors is determined by the mutual induction between the sensors (i.e., if the sensors are not sufficiently separated, the output signal of one sensor depends noticeably on the output signal of another sensor, complicating signal processing). In one embodiment of a hand-held line locator 500, left sensor 301 and right sensor 302 are separated by about eight (8) cm.

Additionally, the elevation of left sensor 301 and right sensor 302 may have any value. In order to measure a magnetic field strength that is as high as possible, so that the magnitude of the output signals from the two sensors will be as large as possible, left sensor 301 and right sensor 302 should be positioned as close to surface 7 as possible. However, a limiting factor on how close to surface 7 the sensors can be located is that the magnetic field becomes distorted close to the-surface of the earth. This distortion can interfere with the ability of line locator 500 to accurately detect the horizontal position of line locator 500 with respect to line 4. At higher mounting elevations, the magnetic field strength is less and therefore the output signal from the sensors will be smaller.

In some embodiments, line 4 is caused to radiate by a transmitter 510 that is coupled (either inductively or by direct electrical connection) to line 4. Line 4 may also radiate without an external transmitter, such as, for example, if line 4 is an underground electric power cable that radiates at 60 Hz and harmonics of 60 Hz (50 Hz in European countries). Additionally, transmitter 510 can be coupled to line locator 500 through a receiver section 511 so that signals such as the PHREF signal can be transmitted between line locator 500 and transmitter 511.

Figure 6A:
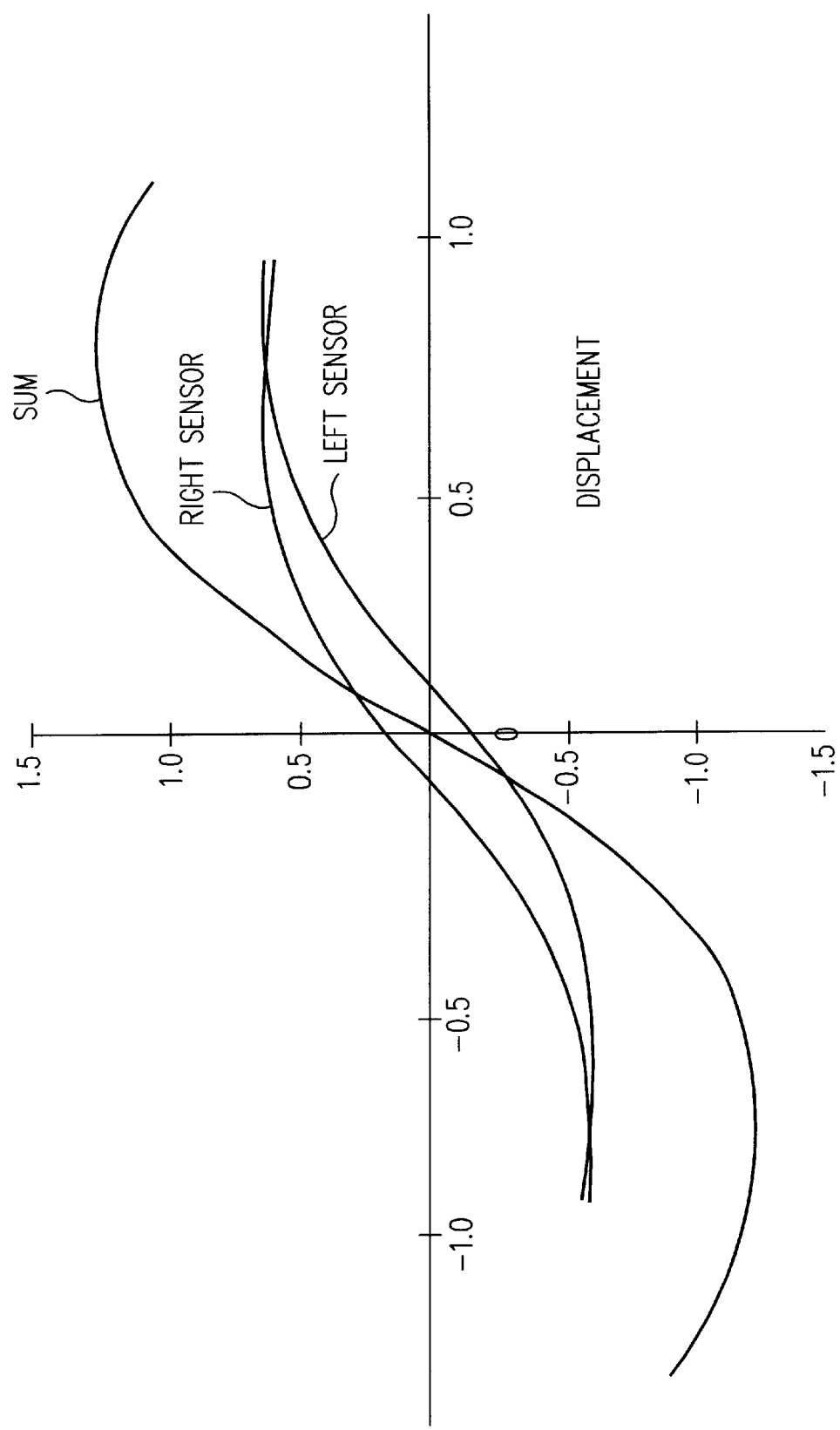
FIG. 6A shows a graph of the output signals from a vertically oriented left sensor, a vertically oriented right sensor and the sum of the output signals from the left sensor and the right sensor as a function of lateral displacement of the line locator from the line.

FIG. 6A shows the magnitude of output signals from left sensor 301 and right sensor 302 as a function of lateral position of line locator 500 with respect to line 4. In FIG. 6A, left sensor 301 and right sensor 302 are vertically oriented and symmetrically placed with respect to center plane 306, as shown in FIG. 5. In addition, left sensor 301 and right sensor 302 have substantially similar responses to magnetic fields. The change in sign of the magnitude of the output signals indicates the polarity change in the output signal as the sensor crosses the x=0 point.

As can be seen from FIG. 6A, the output signal from right sensor 301 has a negative polarity when positioned to the left of line 4 (see FIG. 5). The output signal from right sensor 302 is 0 when right sensor 302 is directly above line 4. In FIG. 6A, the output signal from right sensor 302 is 0 when the center point is at half the sensor separation distance to the left of line 4. As right sensor 302 is further moved to the right, the polarity of the output signal becomes positive. The polarity change in the output signal is a result of the vertical component of the magnetic field having opposite orientation for lateral positions to the left of line 4 as opposed to lateral positions to the right of line 4.

Similarly, the magnitude of the output signal from left sensor 301 is shown as negative when left sensor 301 is located to the left of line 4 and becomes 0 when left sensor 301 is directly over line 4 (at a position where the center point is to the right of line 4). As left sensor 301 passes over line 4, the magnitude of the output signal from left sensor 301 changes polarity and becomes positive.

A sum of the output signals from left sensor 301 and right sensor 302 (shown as sum in FIG. 6A) is sharper than either of the output signal from left sensor 301 or the output signal from right sensor 302 individually (i.e., the slope of the sum of the output signals is greater than the slope of the output signals). In addition, the sum signal is zero (0) when the center point between the two sensors is directly above line 4 (see FIG. 5). The sum signal, therefore, provides a detection signal that is sharp and indicates reliably whether center plane 306 is to the left or to the right of line 4. In addition, the lateral position of line locator 500 can be reliably determined from the magnitude of the sum signal.

Figure 6B:
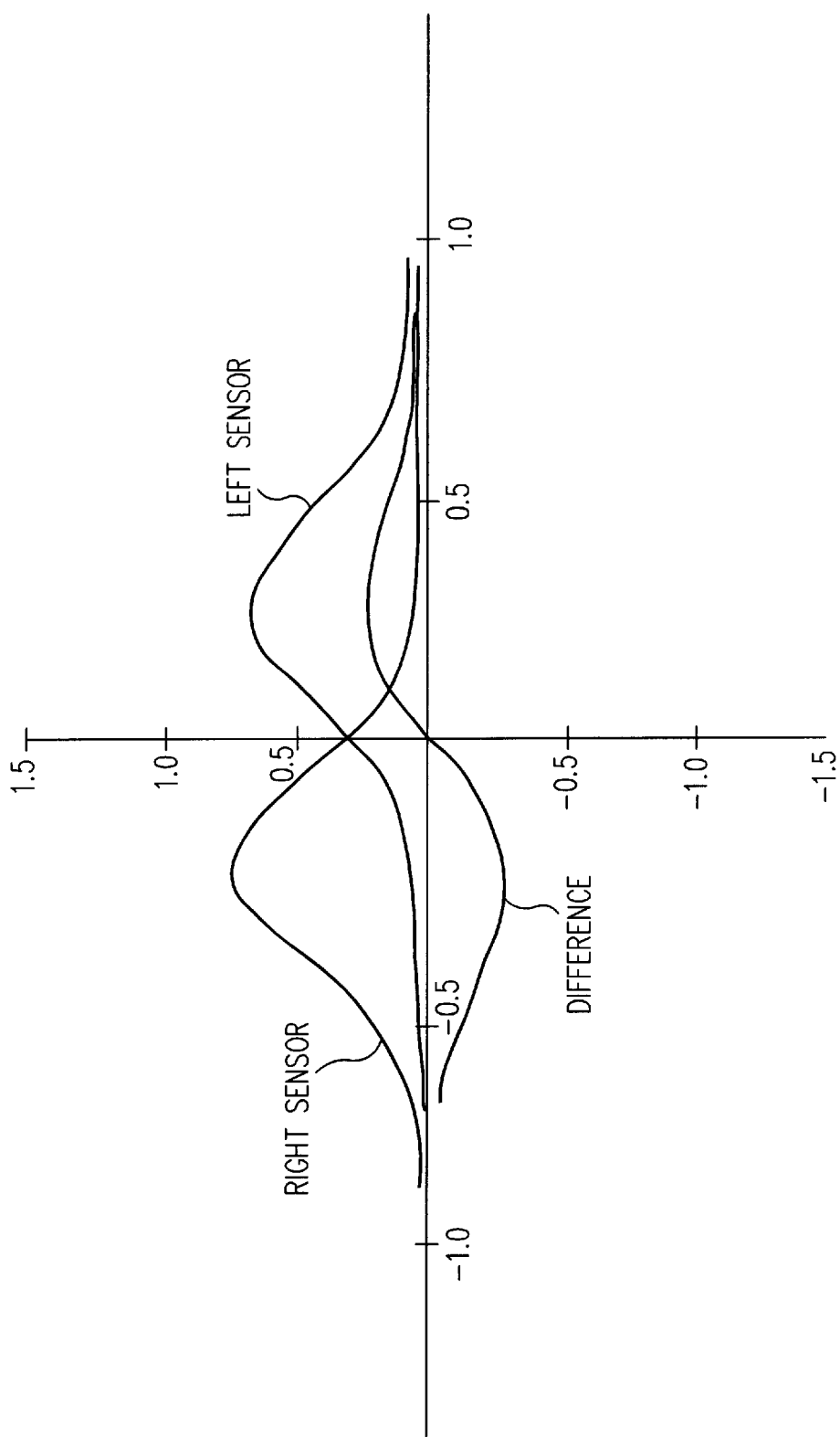
FIG. 6B shows a graph of the output signals from a horizontally oriented left sensor, a horizontally oriented right sensor, and the difference of the output signals from the left sensor and the right sensor as a function of lateral displacement of the line locator from the line.

In contrast, FIG. 6B shows the output signal of left sensor 301 (see FIG. 5) and right sensor 302 for embodiments where left sensor 301 and right sensor 302 are horizontally oriented. In that case, left sensor 301 and right sensor 302 detect the horizontal component of the magnetic field, which is always directed in the same sense everywhere above surface 7 (i.e., the horizontal direction of the magnetic field has the same polarity for all locations above surface 7). Therefore, the magnitude of the output signals from left sensor 301 and right sensor 302 are always positive (i.e., the magnitudes of the output signals do not change polarity) and have a peak (instead of a zero crossing) when the magnetic field sensor lies directly over line 4. The output signal from right sensor 302 peaks when the center line 306 is to the left of line 4 and left sensor 302 peaks when the center line 306 is to the right of line 4. Detection of line 4 with horizontally oriented sensors requires that a difference of the output signals from left sensor 301 and right sensor 302 be used. This difference curve is shown in FIG. 6B.

A comparison of the difference signal shown in FIG. 6B and the sum signal shown in FIG. 6A indicates that orienting left sensor 301 and right sensor 302 vertically yields larger and sharper signals. If the detection circuitry takes the sum of the output signals from left sensor 301 and right sensor 302, then horizontally oriented sensors should not be used because horizontally oriented sensors are not sensitive to components of the magnetic field that experience a polarity change when passed over line 4. Alternatively, if the detection circuitry takes the differences of the two output signals, vertically oriented sensors should not be used because the information contained in the polarity change will be lost and any difference in magnitude between the two output signals will also lost (the magnitudes will actually add).

Figure 7A:
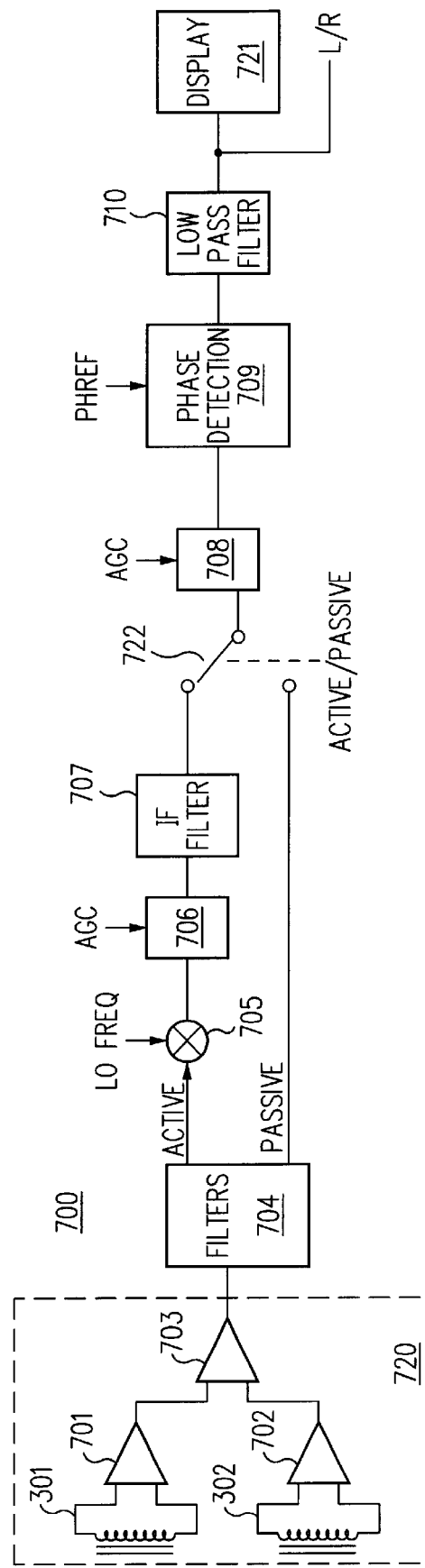
FIG. 7A shows a block diagram of a circuit for processing the output signals of the left sensor and the right sensor of FIG. 5.

FIG. 7A shows an embodiment of a circuit 700 for obtaining a left/right signal, which indicates the horizontal position of line locator 500 with respect to line 4, according to the present invention. In this exemplary embodiment, left sensor 301 and right sensor 302 are oriented vertically, have substantially similar response to magnetic fields, and are symmetrically mounted with respect to center plane 306. One of ordinary skill in the art will recognize how to modify circuit 700 in order to detect a left/right signal from other orientations of left sensor 301 and right sensor 302. In addition, one of ordinary skill in the art will be able to modify circuit 700 in order to properly analyze the output signals from left and right sensors that are not substantially identical or not symmetrically mounted with respect to center plane 306.

Detection circuit 700 includes an input circuit 720. Input circuit 720 includes left sensor 301, right sensor 302, pre-amplifiers 701 and 702, and a convolution amplifier 703. The output signals from left sensor 301 and right sensor 302 are amplified by pre-amplifiers 701 and 702, respectively. The output signals from preamplifier 701 and 702 are summed and the sum is amplified in convolution amplifier 703. Note that if left sensor 301 and right sensor 302 are horizontally oriented, then convolution amplifier 703 can be replaced by a difference amplifier that amplifies the difference in the output signals from preamplifiers 701 and 702. In other embodiments, amplifier 703 may perform any convolution of the output signals from right sensor 302 and left sensor 301. The convolution function depends on the response and orientation of sensors 301 and 302.

Figure 7B:
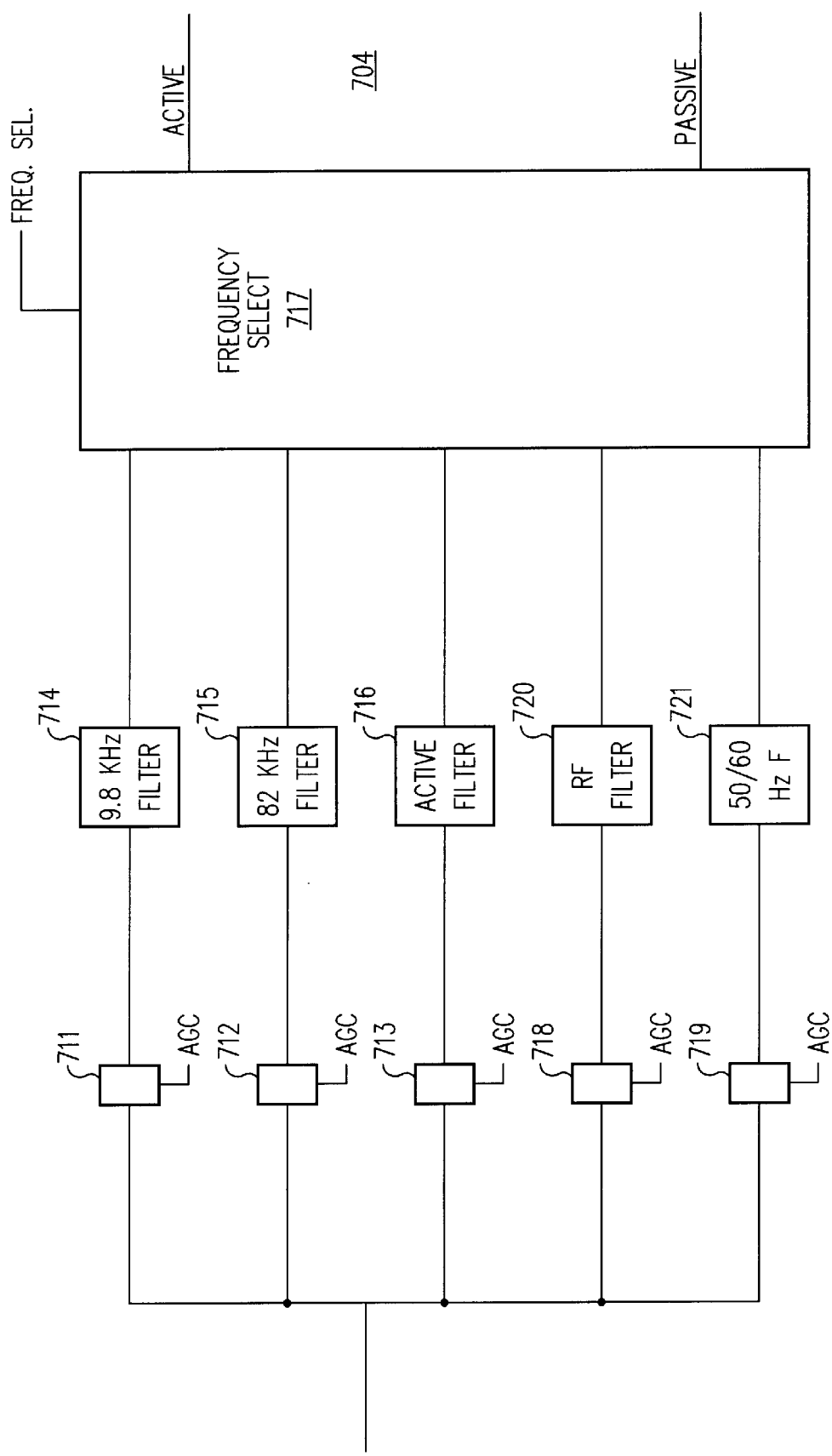
FIG. 7B shows a block diagram of a filter circuit that can be used in the circuit of FIG. 7A.
Figure 7C:
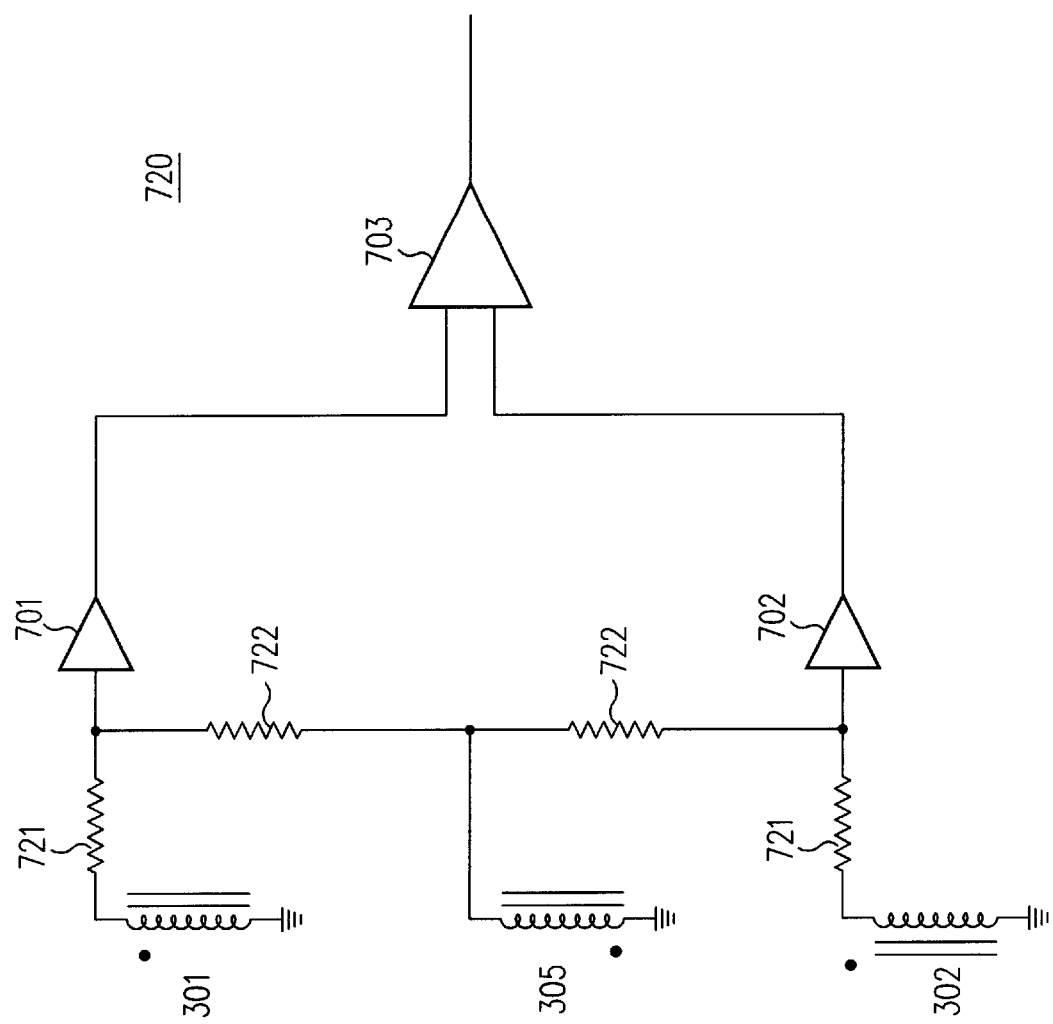
FIG. 7C shows a block diagram of an input circuit that can be used in the circuit of FIG. 7A.

FIG. 7C shows an input circuit 720 for a line locator 300 that includes a field sensor 305. Left sensor 301, right sensor 302 and field sensor 305 are vertically oriented. Field sensor 305 is arranged to have an output signal which is of opposite polarity from left sensor 301 and right sensor 302 when subjected to the same magnetic field, as is indicated by the dots adjacent the magnetic field sensors 301, 302 and 305 in FIG. 7C. Resistors 721 and 722 should be chosen so that the effect of field sensor 305 is to correct the output signals of left sensor 301 and right sensor 302 for ambient magnetic fields not associated with line 4 (See FIG. 3). The corrected output signal from left sensor 301 and the corrected output signal from right sensor 302 are amplified by preamplifiers 701 and 702, respectively. The output signals from preamplifiers 701 and 702 are summed and the sum amplified by convolution amplifier 703.

Figure 12A:
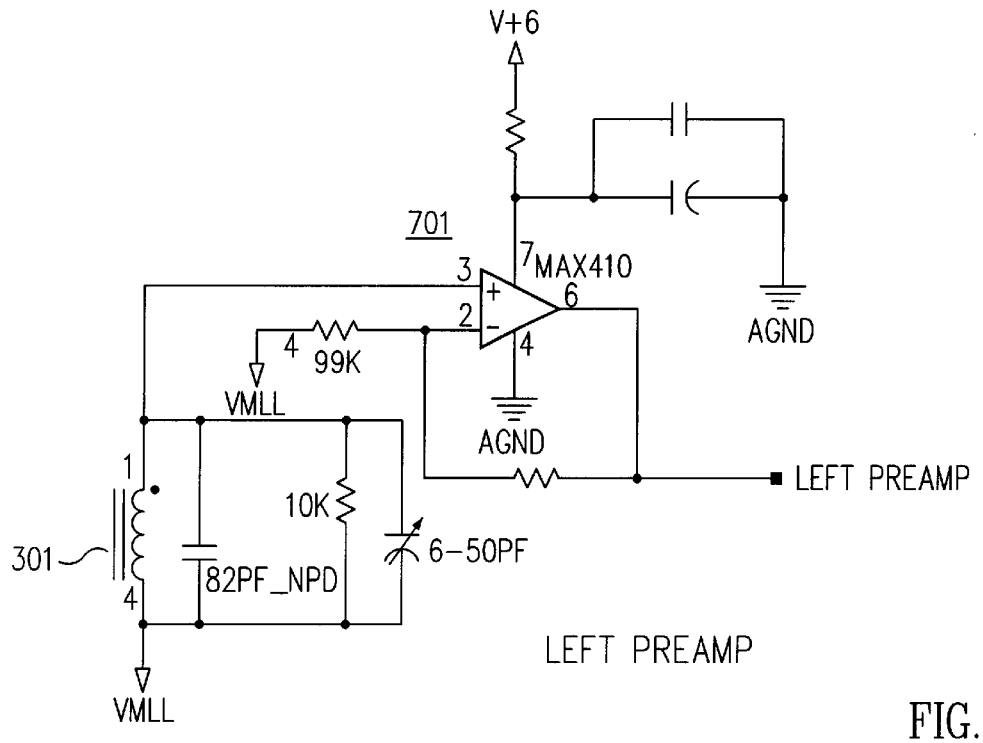
FIG. 12A through 12P show circuit diagrams for individual elements of the block diagrams shown in FIGS. 7A, 7B, 10A, and 11A.
Figure 12B:
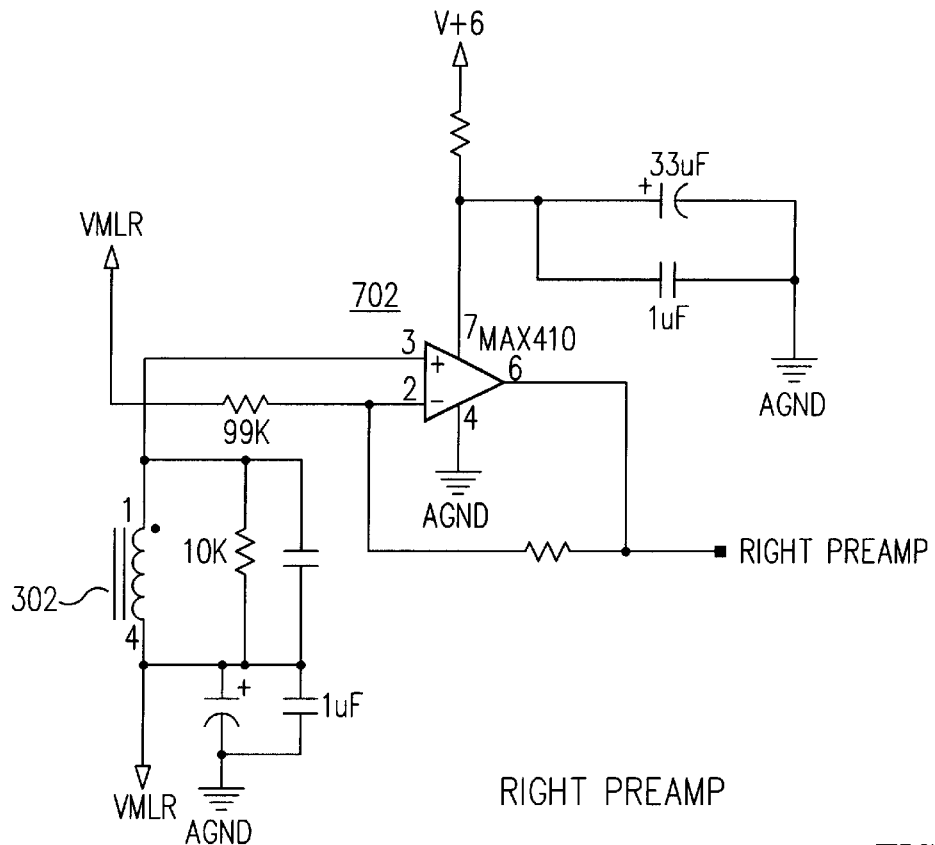
Figure 12C:
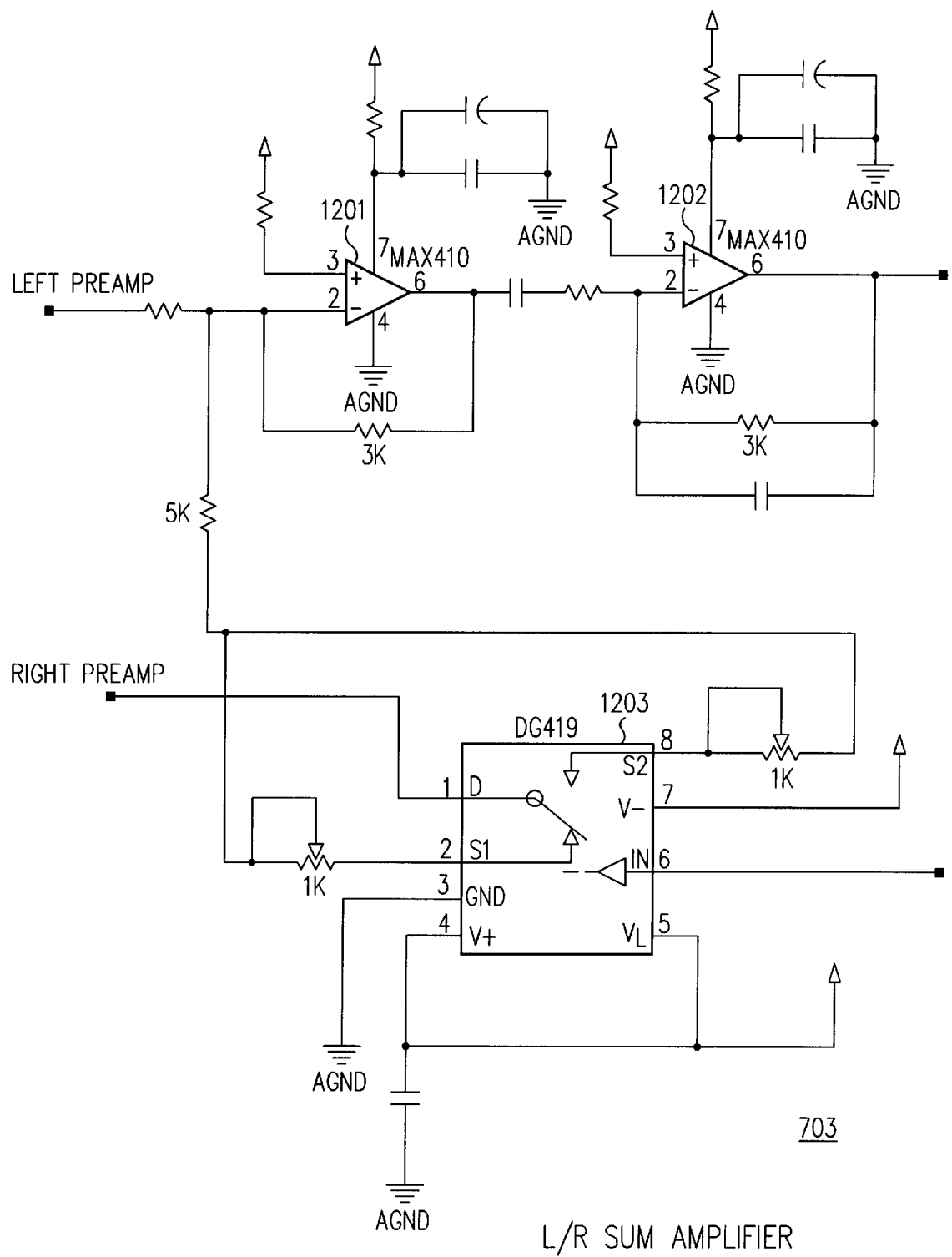

FIGS. 12A, 123 and 12C show a circuit diagram for one embodiment of input circuit 720. In FIGS. 12A and 12B, preamps 701 and 702 are operational amplifiers. Convolution amplifier 703 includes two operation amplifiers 1201 and 1202. Switch 1203 allows for two calibrations of the left/right circuitry 700, depending on the actual lateral position of line locator 500 with respect to line 4.

In FIG. 7A, the output signal from input circuit 720 (i.e., the output signal from convolution amplifier 703) is filtered by filter 704. Filter 704 is a band-pass filter arranged to pass signals of a particular frequency. Filter 704 may be a single band-pass filter, may include the ability to select from one or more discrete frequencies or may be a tuner that is capable of selecting frequencies from a continuous spectrum of frequencies. FIG. 7B shows a filter 704 having the ability to pass signals selected from the frequencies 9.8 kHz, 82 kHz, 982 Hz, 50 Hz, 60 Hz or harmonics of 50 or 60 Hz. Filter 704 in FIG. 7B comprises a filter array having a separate signal path for each of a 9.8 kHz filter 714, a 82 kHz filter 715, and active filter 716. In general, a separate path for any number of individual filters can be included in filter 704. Also, the filters can be of any type (e.g., active filters, passive filters, digital filters and switched capacitor filters).

Figure 12D:
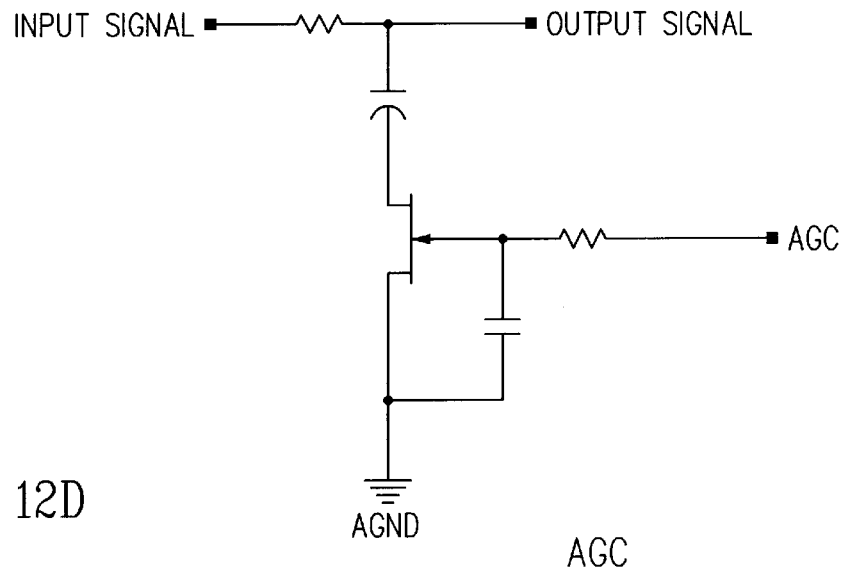

In FIG. 7B, the output signal from input circuit 720 is received by AGC amplifiers 711, 712, 713, 718 and 719, each of whose individual gain is determined by an automatic gain control (AGC) signal. In general, filter 704 can include any number of separate filter paths. The output signals from each of AGC amplifiers 711, 712, 713, 718 and 719 are separately arranged to provide appropriate input signals for 9.8 kHz filter 714, 82 kHz filter 715, and active filter 716, respectively. In some embodiments, a single AGC amplifier can provide an output signal to each of the filter paths in the filter. A circuit diagram for an embodiment of an AGC amplifier is shown in FIG. 12D.

Figure 12K:
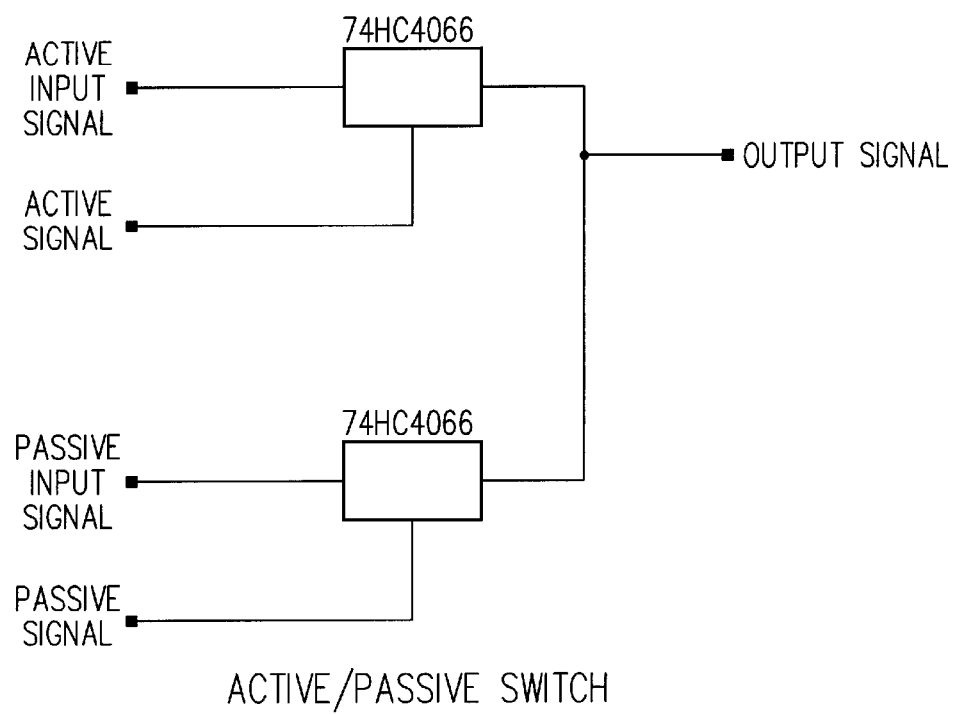
Figure 12E:
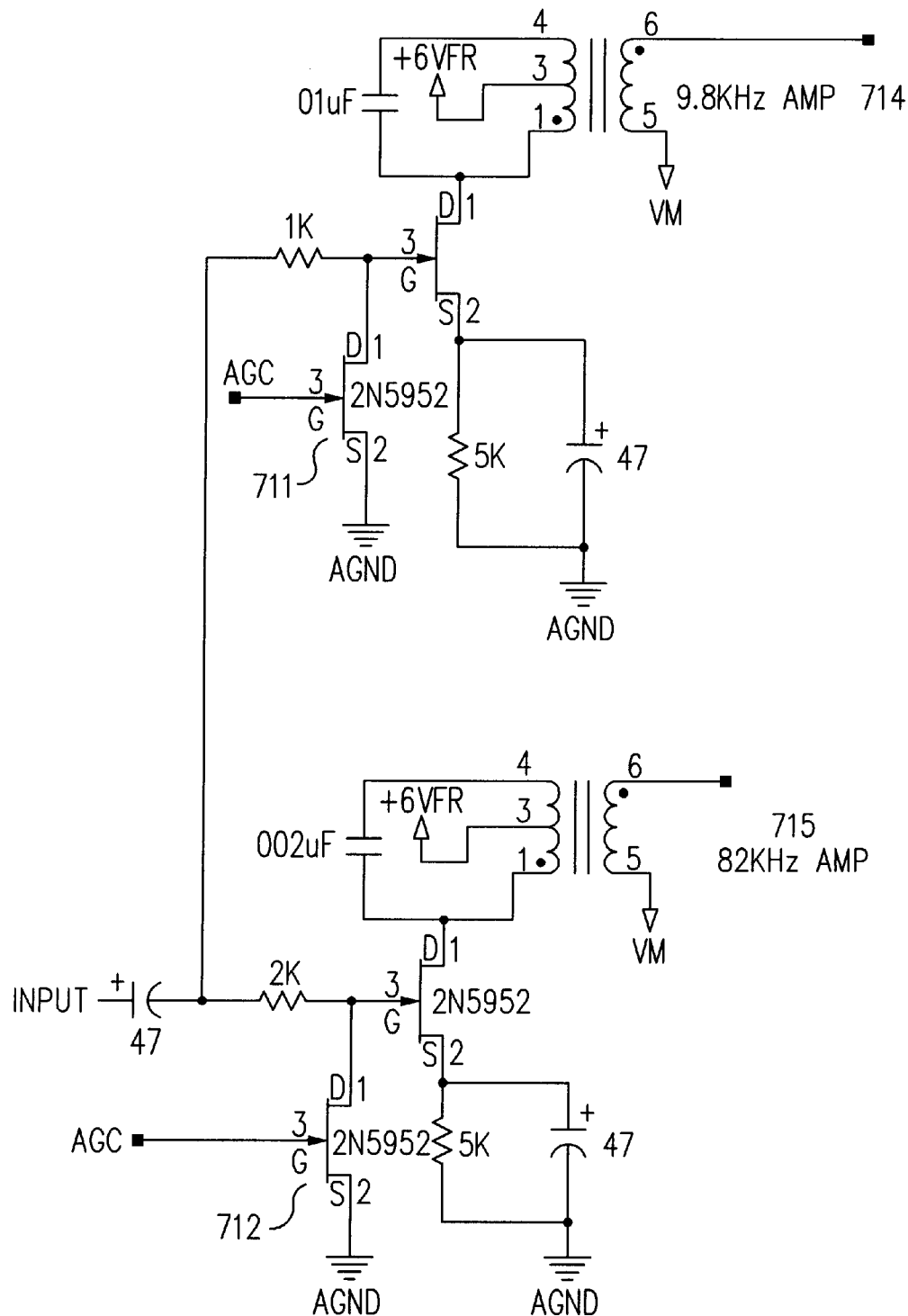

In FIG. 7B, filter 714 is a band-pass filter arranged to pass signals having a frequency of about 9.8 kHz. Filter 715 is a band-pass filter arranged to pass signals having a frequency of about 82 kHz. An embodiment of filters 714 and 715 along with AGC amplifiers 711 and 712 are shown in FIG. 12E.

Figure 12G:
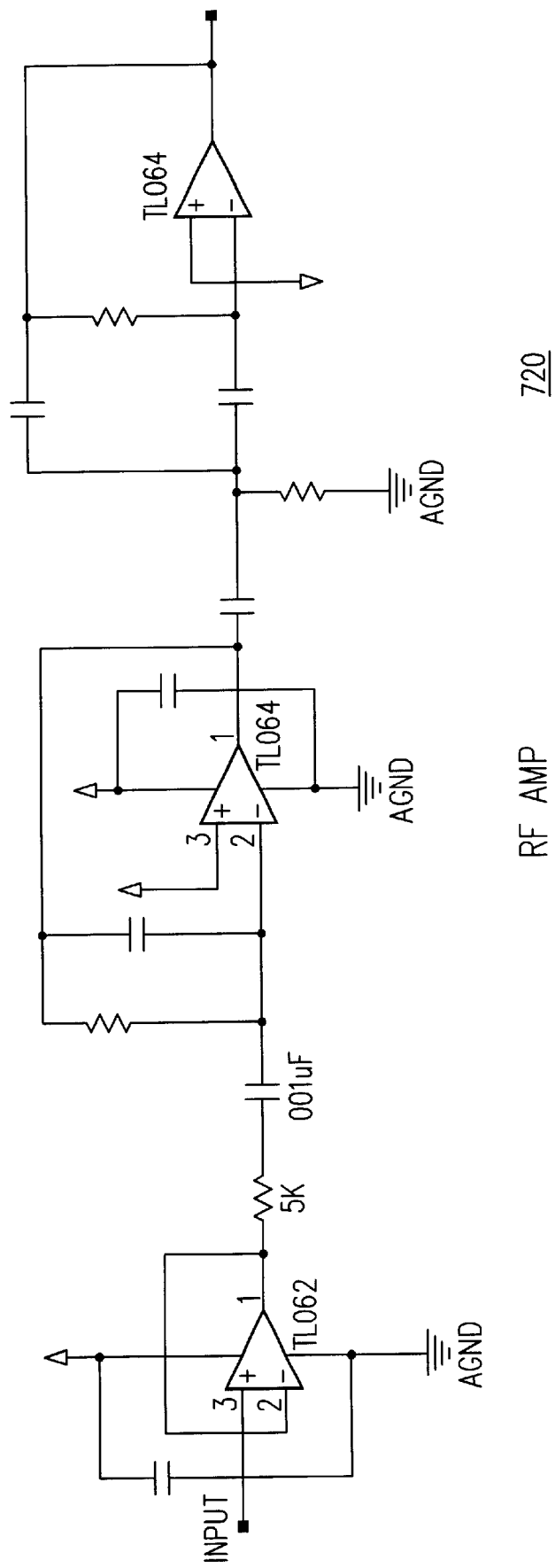

Active filter 716 is a notch and band-pass (comb) filter. Filter 716 passes 982 Hz. In addition to these frequencies, embodiments of this invention may include filters appropriate for specific applications, such as, for example, detection of power lines. Filter 704 in FIG. 7B includes, for example, RF filter 720 and 50 or 60 Hz filter 721. A 60 Hz filter is shown in FIG. 12F and an RF filter is shown in FIG. 12G. Filter 704 (FIG. 7A) may also include filters appropriate for particular transmitters 510, which may not use the more conventional 9.8 kHz or 82 kHz frequencies (such as, for example, a 35 kHz filter).

In FIG. 7B, the output signals from each of the filter paths-is received by frequency select 717. Frequency select 717, in response to a FREQSEL signal, provides an output signal corresponding to the output signal of one of the filters in the filter array. The FREQ SEL signal can originate from a mechanical switch or from a controller (see FIG. 8) in response to operator input.

Figure 12H:
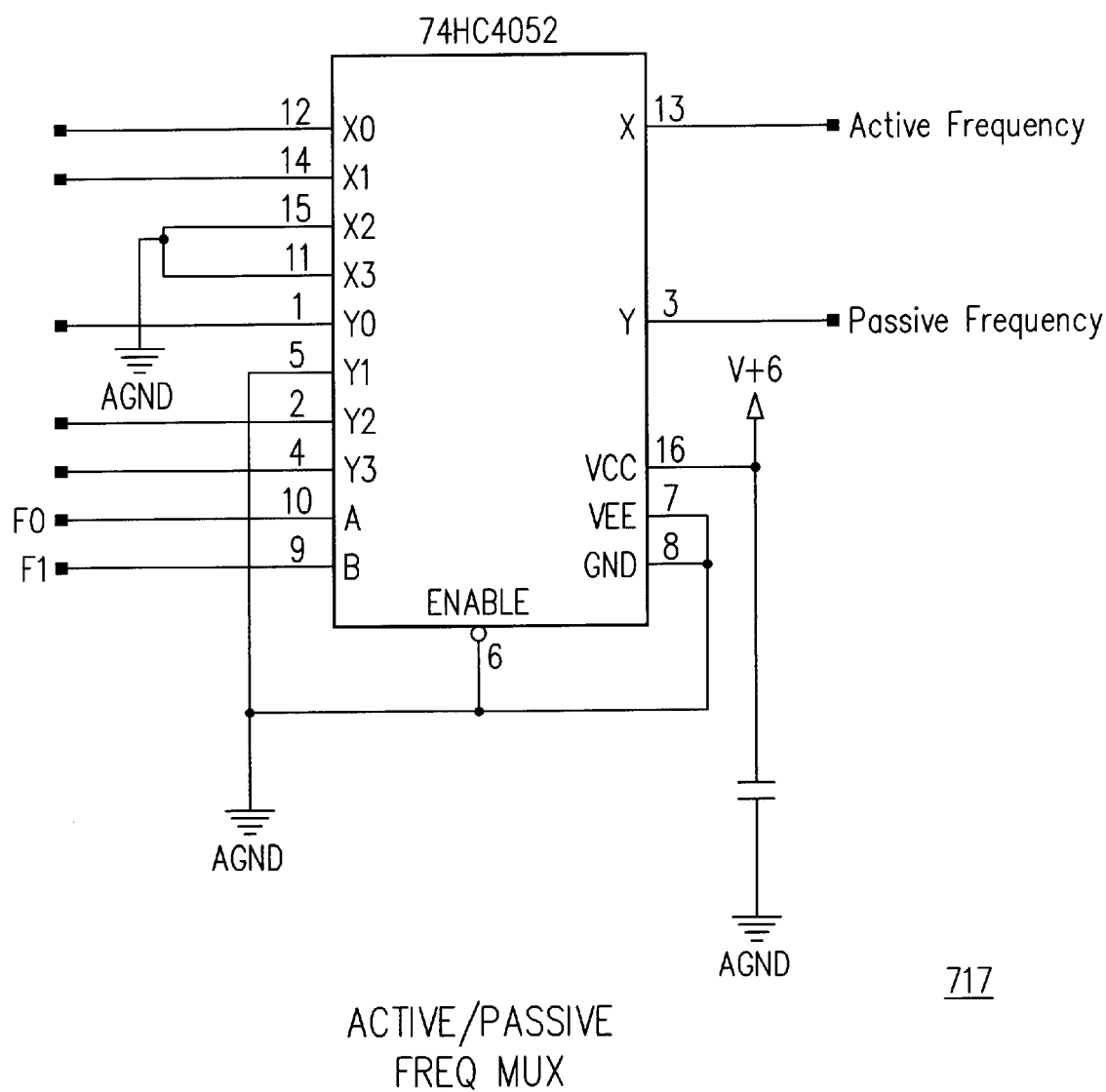

In some embodiments, as shown in FIG. 7A, frequency select 717 separately outputs signals from active operation (for example, 9.8 kHz or 82 kHz signals) from passive operation signals (for example 50 or 60 Hz signals from power lines). A circuit diagram for an embodiment of frequency select 717 is shown in FIG. 12H.

One reason for separating the active frequencies from the passive frequencies is that, because the signal frequencies in active mode are narrow band, further filtering can easily be performed on these signals. Passive RF frequency signals, for example, are typically broadband (about 10 to 20 kHz) and further filtering would be difficult. Additionally, power line frequencies (50 or 60 Hz) are low frequencies compared with the active frequencies and would not benefit from the further filtering that can be performed on the active frequency signals.

In addition, filter 704 of FIG. 7A may be a digital filter, such as that described in U.S. Pat. No. 5,065,098, issued to Salsman et al., herein incorporated by reference in its entirety. Digital signal processing is especially useful in embodiments of the invention that include a microprocessor for controlling the line locator and for signal processing.

Figure 12I:
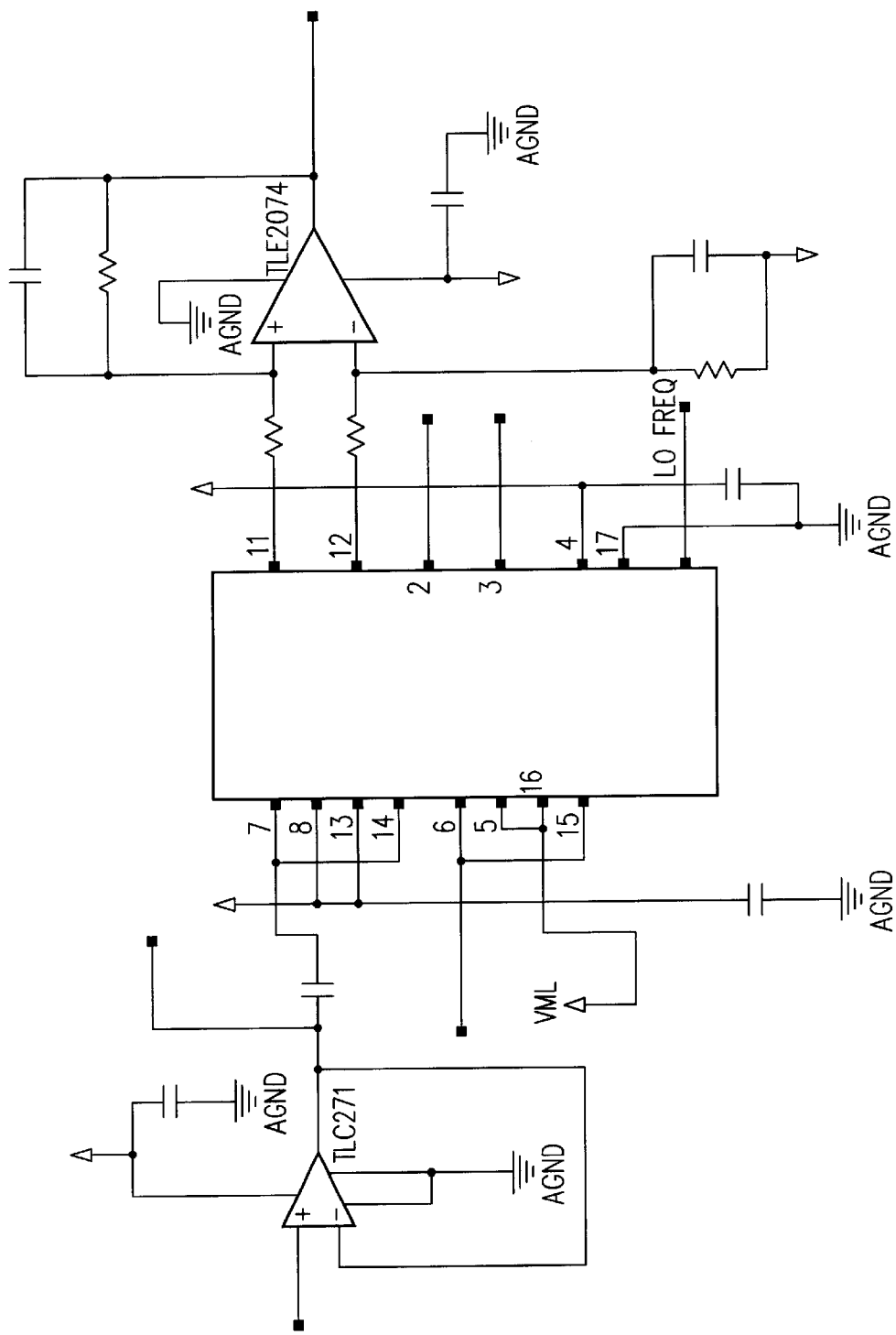

In FIG. 7A, the active output signal from filter 704 is mixed with a LO FREQ signal in mixer 705. The LO FREQ signal is generated by a local oscillator (see FIG. 8) and is generally a signal having a frequency LO FREQ=FREQ+IF, where FREQ is the active operating frequency and IF is the intermediate frequency. In one embodiment, IF is about 560 Hz. In general, IF can be any convenient frequency. In some embodiments, the amplitude of the LO FREQ signal is arranged to be 5 V. An embodiment of a mixer such as mixer 705 is shown in FIG. 12I.

Mixer 705 subtracts the active output signal of filter 704 from the LO FREQ signal. Other mixer convolution functions could be used in mixer 705. The output signal from mixer 705 has a beat frequency equal to IF. The output signal from mixer 705 (FIG. 7A) is received by AGC amplifier 706. AGC amplifier 706 has a gain that is determined by the AGC signal. An embodiment of an AGC amplifier is shown in FIG. 12D.

In general, a signal processing circuit such as that shown in FIG. 7A will include a number of AGC amplifiers dispersed throughout the circuit rather than having one amplifier that supplies all of the required gain to the signal being processed. The approach of having several AGC amplifiers prevents components of the system from either being overloaded due to signals that are too large or from having to process signals that are too weak.

Figure 12J:
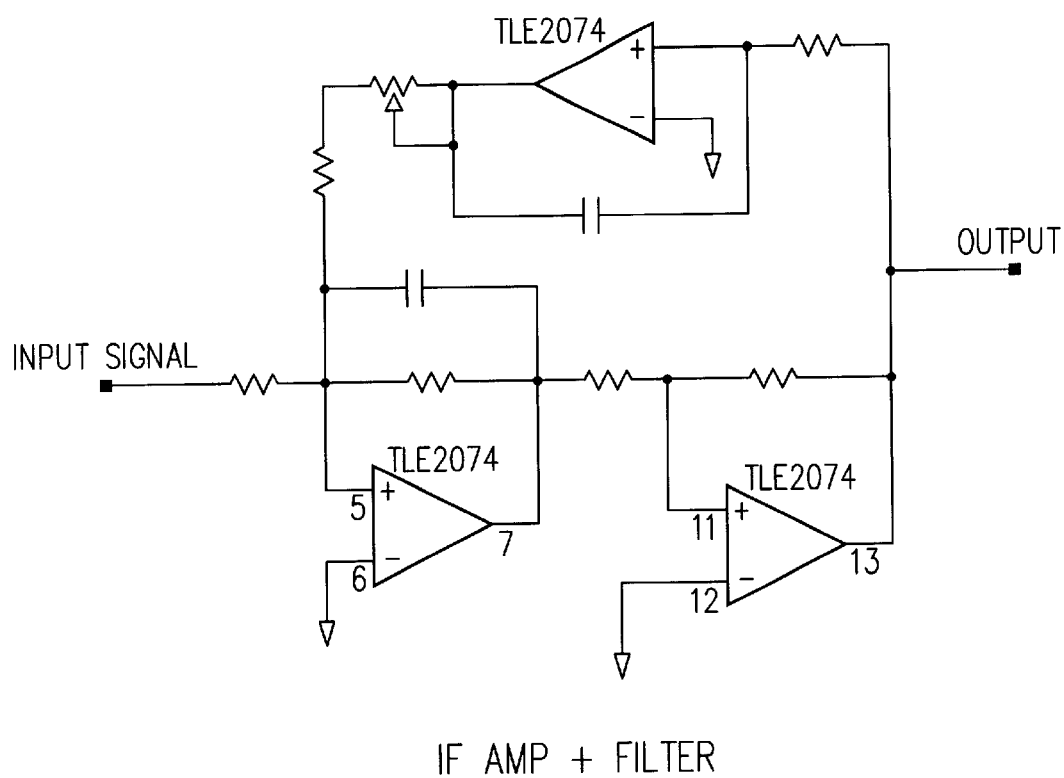

The output signal from AGC amplifier 706 (FIG. 7A) is filtered in IF filter 707. IF filter 707 is a band-pass filter arranged to pass signals at the IF frequency and have a narrow band width. In one embodiment, the IF frequency is about 560 Hz and the bandwidth is as narrow as 10 Hz. An embodiment of IF filter 707 is shown in FIG. 12J.

Switch 722 (FIG. 7A) selects between the active signal output channel from filters 704 or the passive signal output from filters 704 in response to an active/passive signal. The active/passive signal is determined by the FREQ SEL signal (e.g., if the FREQ SEL indicates 60 Hz operation then the active/passive signal is set to passive). An embodiment of switch 722 is shown in FIG. 12K.

Figure 12L:
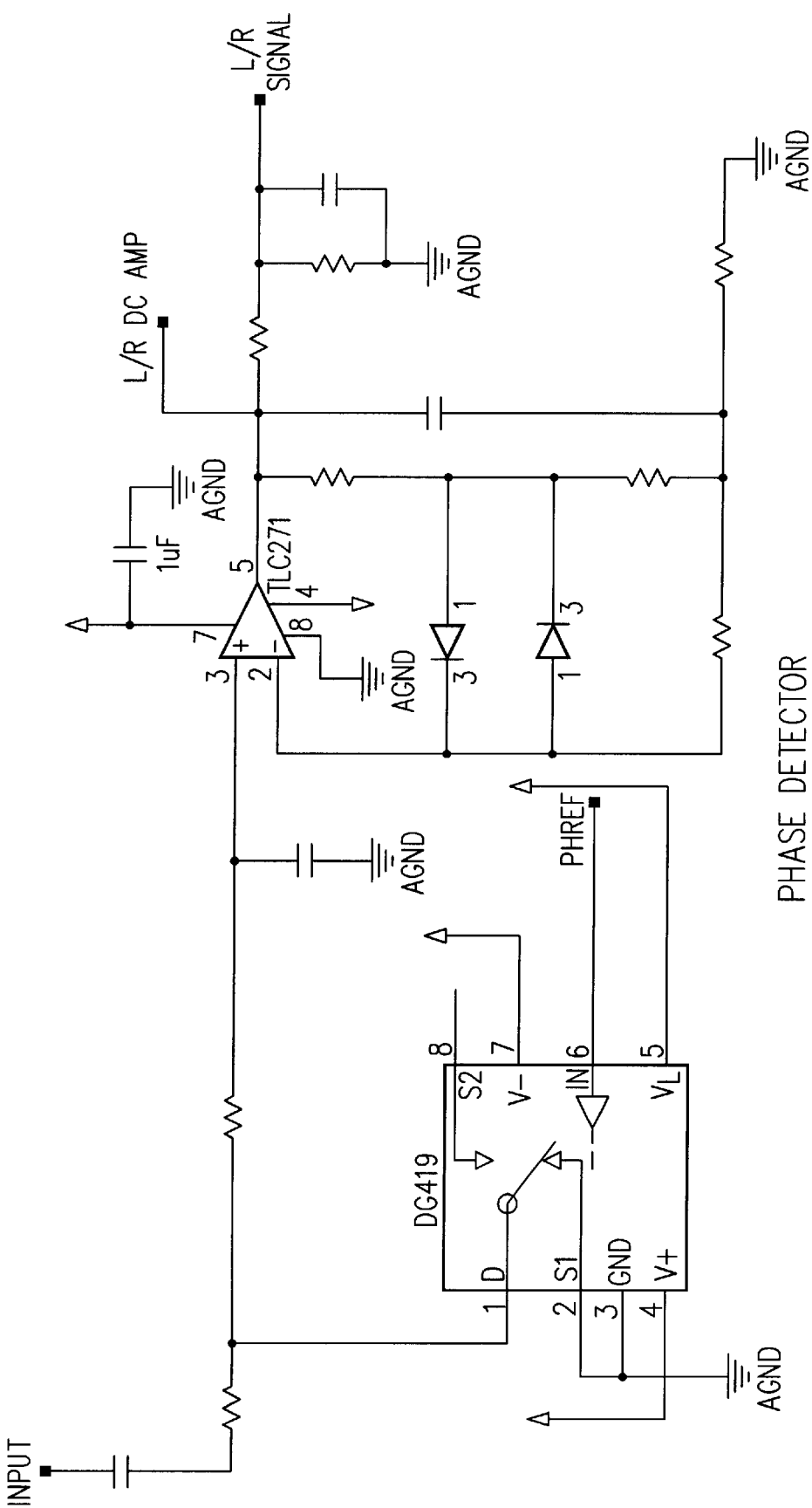

The output signal from switch 722 (FIG. 7A) is amplified in AGC amplifier 708, and received in phase detector 709. An embodiment of an AGC amplifier such as AGC amplifier 708 is shown in FIG. 12D. An embodiment of phase detector 709 is shown in FIG. 12L.

Phase detector 709 receives the output signal from AGC amplifier 709 and the PHREF signal and outputs a DC signal having amplitude proportional to the output signal from AGC amplifier 708 and sign equal to the polarity, with respect to the PHREF signal, of the output signal from input circuit 720. Using phase detection with the PHREF signal not obtained using the output signals from left sensor 301 or right sensor 302 detects the polarity and amplitude information contained in the convoluted output signal from convolution amplifier 703. In the embodiment of the phase detector shown in FIG. 12L, the PHREF signal is a pulse wave having a frequency equal to the IF frequency of IF filter 707. For passive operation, the PHREF signal has a frequency that is related to the operating frequency of the line locator. The output signal from phase detector 709 is filtered in low pass filter 710 to obtain the L/R output signal.

In some embodiments, the L/R signal can be coupled into a display 721 directly. Display 721 indicates to an operator, visually or audibly, whether line locator 500 is to the left of line 4 or to the right of line 4 based on the left/right output signal. In some embodiments, the magnitude of the left/right output signal is also used to give an indication to an operator of how far line locator is positioned from line 4.

Figure 8:
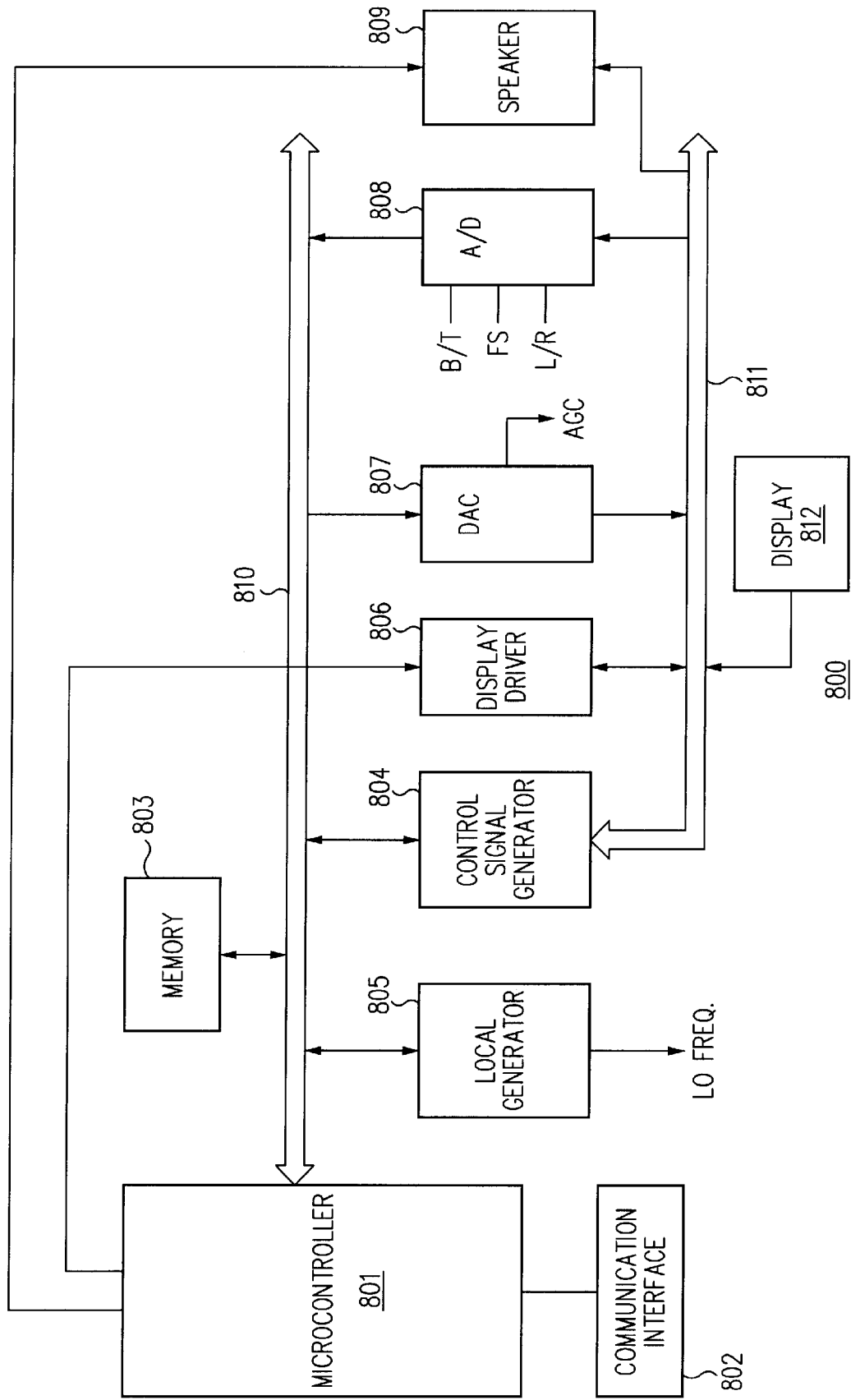
FIG. 8 shows a block diagram of a controller for line locator.
Figure 13:
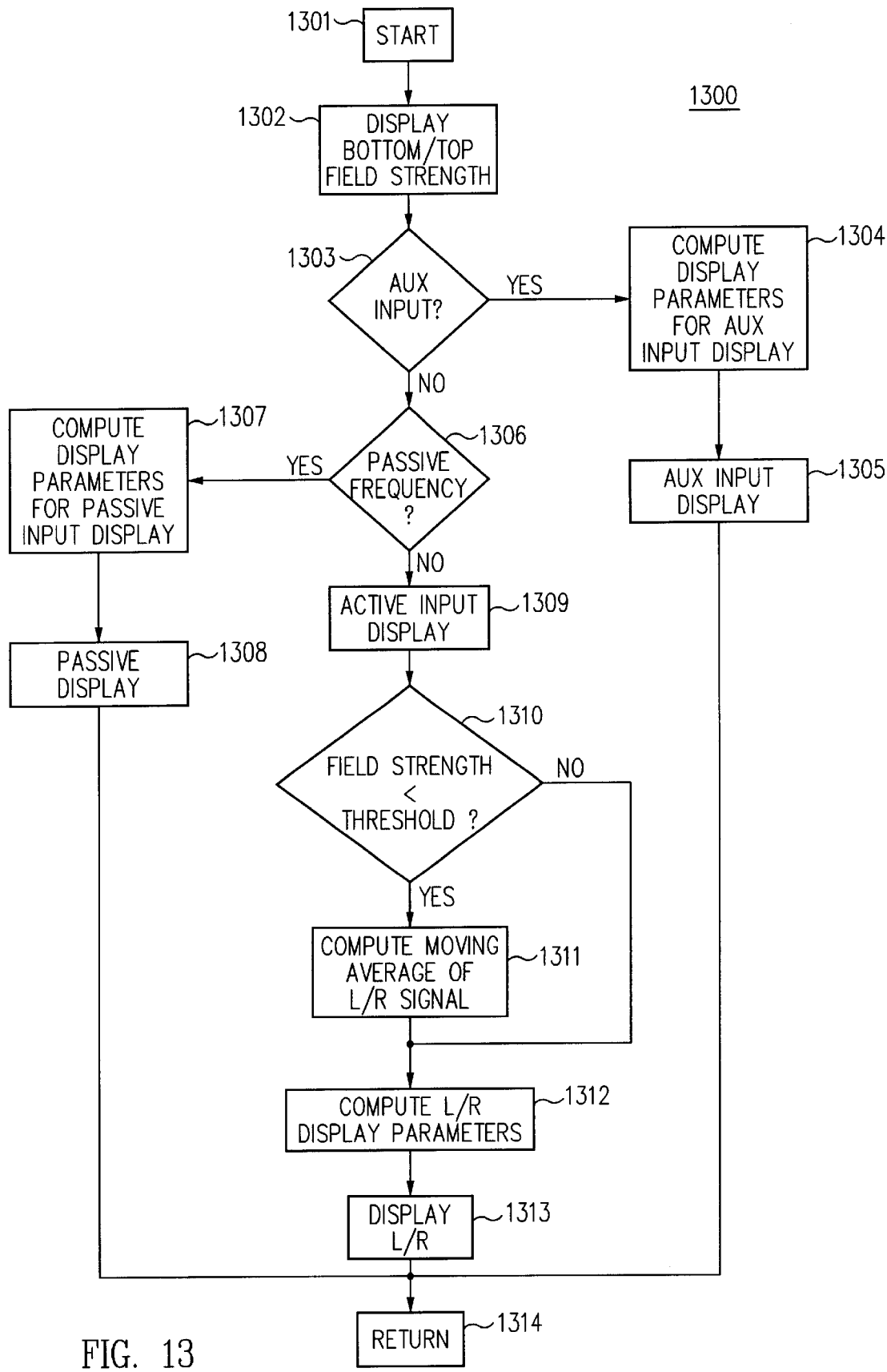
FIG. 13 shows a flow chart for software executed by the controller shown in FIG. 8 for operating a left/right like locator.

In many embodiments of the invention, the L/R signal is received by a controller. FIG. 8 shows a controller 800 that includes a microcontroller 801, memory 803, display driver 806, digital to analog converter (DAC) 807, and analog to digital converter (A/D) 808. FIG. 13 shows a flow chart of software code executed by controller 800 to operate the left/right portion of a line locator such as line locator 500. Microfiche Appendix A includes software code for a line locator as shown in FIG. 5.

In FIG. 8, microcontroller 801 may be any of the readily available microcontrollers, such as the INTEL 80C32 microprocessor, depending on the extent of data processing capabilities that are desired. Microcontroller 801 is coupled to bus 810 for communications with other control components. Microcontroller 801 can also be coupled with a communications interface 802 for external downloading of programming or other communications. Communications interface 802 may be any interface, including an RS232 interface, IEEE488 interface, or any other interface used to exchange data with devices external to line locator 500. In some embodiments, input sensors 301, 302, 303, 304 or other sensors or receivers of line locator 500 may be utilized as transceiver antennas for wireless transmission of data to external devices. Communications interface 802 can also include an operator interface so that the operator can choose parameters such as the operating frequency (i.e., the FREQ SEL signal).

Figure 14:
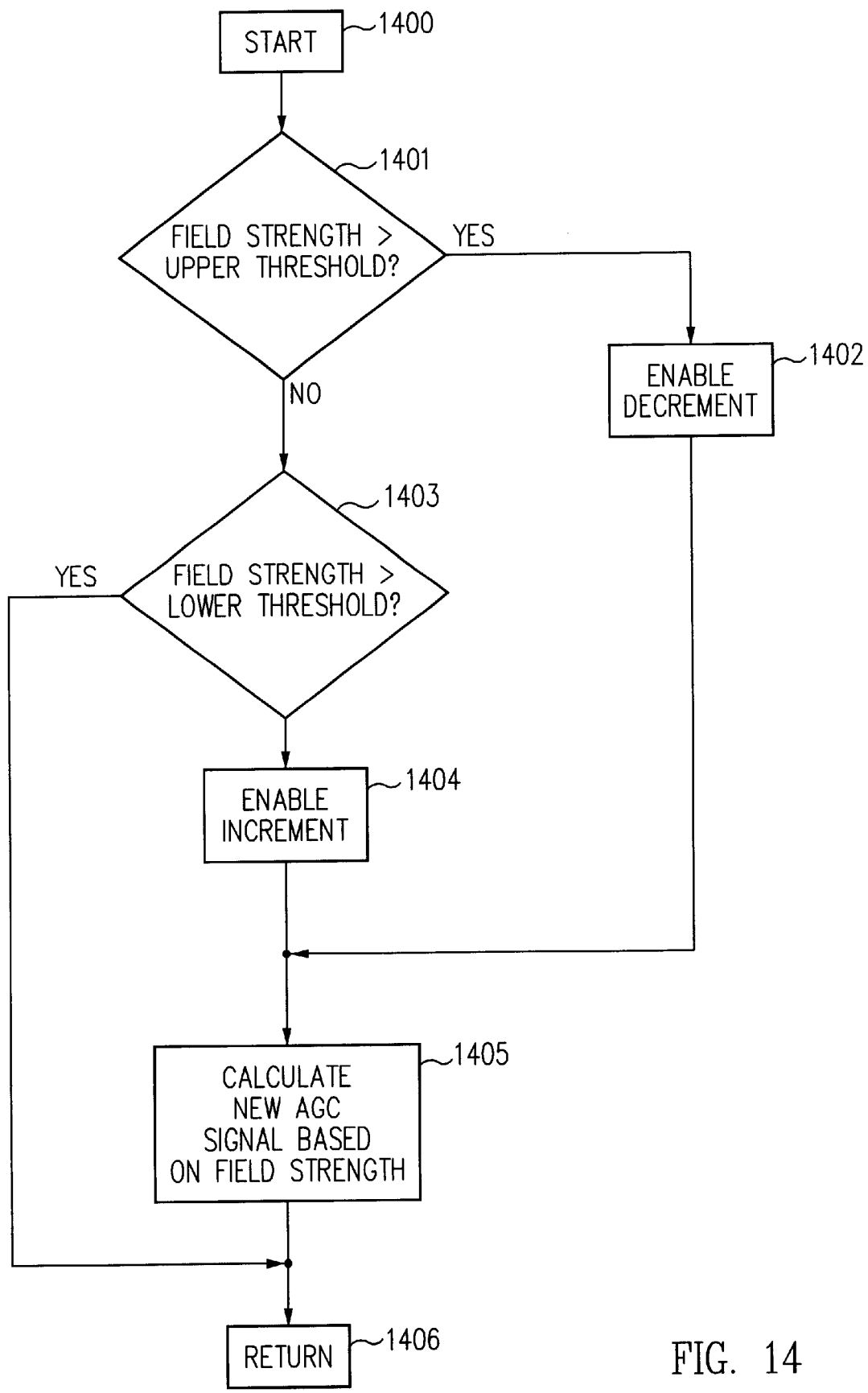
FIG. 14 shows a flow chart for software executed by the controller shown in FIG. 8 that generates an AGC signal.

Memory 803 may be any memory storage device including SRAM, DRAM, flash memory, or other device capable of receiving and storing data. Memory 803 stores data and programming used by microcontroller 801. The programming for microcontroller 801 may be stored in ROW chips in memory 803 or read from communications interface 802 and otherwise stored in memory 803. DAC 807 provides a method for microcontroller 801 to provide analog signals to the signal processing circuits of the line locator. For example, the AGC signal received in AGC amplifiers 706, 708, and 711–713 (see FIGS. 7A and 7B), can be determined by microcontroller 801 and output through DAC 807 by microcontroller 801. FIG. 14 shows a flow diagram for calculating the AGC signal in controller 800. Microfiche Appendix A includes software code for digitally calculating the AGC signal.

In FIG. 8, A/D 808 receives and digitizes analog signals from line locator 500 and converts the analog signals to digital signals that are processed by microcontroller 801. A/D 808, for example, receives the left/right output signal from low pass filter 710 for input to microcontroller 801.

Microcontroller 801 is also coupled to display driver 806. Display driver 806 receives data from microcontroller 801 and appropriately displays the data a for the operator on display 812. Display 812 includes any device for displaying information, including meters, bar indicators, alphanumeric displays and speakers.

Microcontroller 801 also communicates with control signal generator 804 which generates signals, such as the FREQ SEL signal (see FIG. 7B) for selecting filters, used to control other components of line locator 500. In addition, local oscillator 805, which generates the LO FREQ signal (see FIG. 7A), can be controlled by microcontroller 801.

Controller 800 may also include a speaker 809 that receives signals and tones from microcontroller 801 and control signal generator 804. Speaker 809 may provide alternative location signaling for the operator or may be used to indicate errors, i.e by alarm tones, or other control information to the operator. Control signal generator 804 selects speaker 809 and controls parameters such as volume. Microcontroller 801 provides audio frequency control and duration of tones.

In some embodiments, the phase reference signal (PHREF) utilized in phase detector 709 of FIG. 7A can be received directly from transmitter 510 (see FIG. 5). Transmitter 510 may interface with line locator 500 through a wireless interface or by direct electrical communication through a wire connection and external jacks on both line locator 500 and transmitter 510. In these embodiments, line locator 500 includes a PHREF signal receiver 511 and transmitter 510 includes a PHREF signal transmitter. Receiving the PHREF signal directly from transmitter 510 provides for stable phase detection and eliminates problems and instabilities in left/right detection associated with distortion of the magnetic field at surface 7.

Figure 9A:
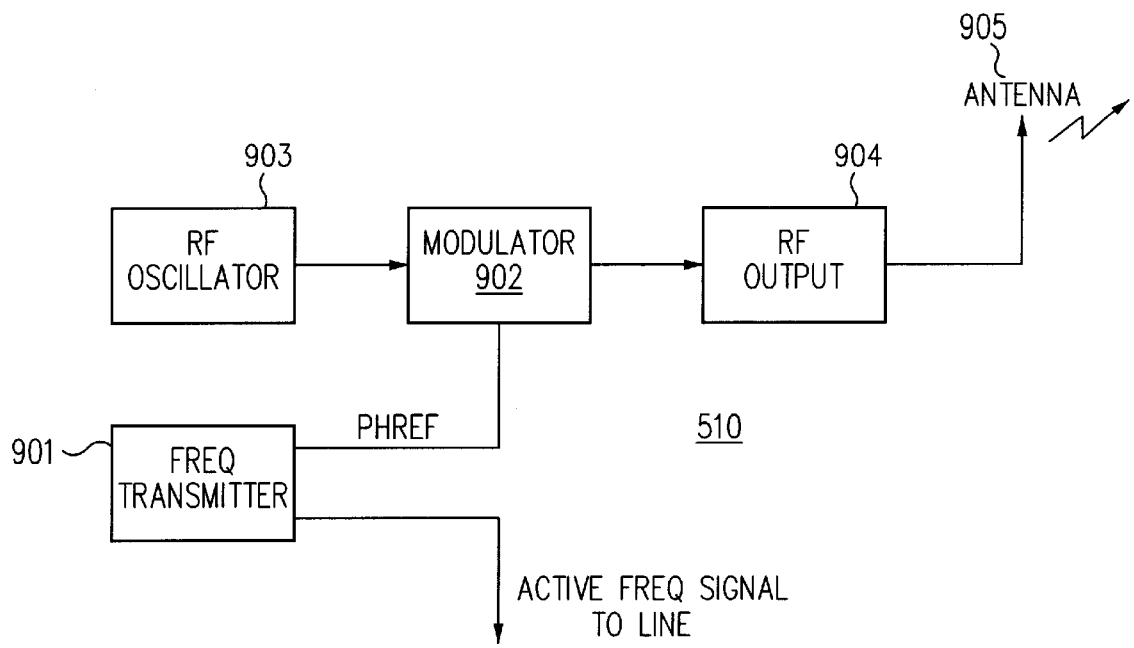
FIG. 9A shows a block diagram of a transmitter that communicates a phase reference signal directly to a line locator.

FIG. 9A shows a block diagram of transmitter 510 where the PHREF signal is communicated to line locator 500 directly from transmitter 510. Transmitter 510 includes a FREQ transmitter 901 that generates an active frequency signal that is coupled to the concealed conductor (line 4 of FIG. 5) in order to excite a time-varying current in the concealed conductor. In addition, FREQ transmitter 901 outputs a signal related to the PHREF signal to modulator 902. Modulator 902 modulates the signal from FREQ transmitter 901 with the output signal from an RF oscillator 903. The modulated signal from modulator 902 is amplified and shaped by RF output 904 before wireless transmission from antenna 905. Antenna 905 can be identical with line 4 (FIG. 5). Alternative to transmission with antenna 905, the modulated signal can be transmitted to line locator 500 (FIG. 5) by direct electrical connection.

Figure 9B:
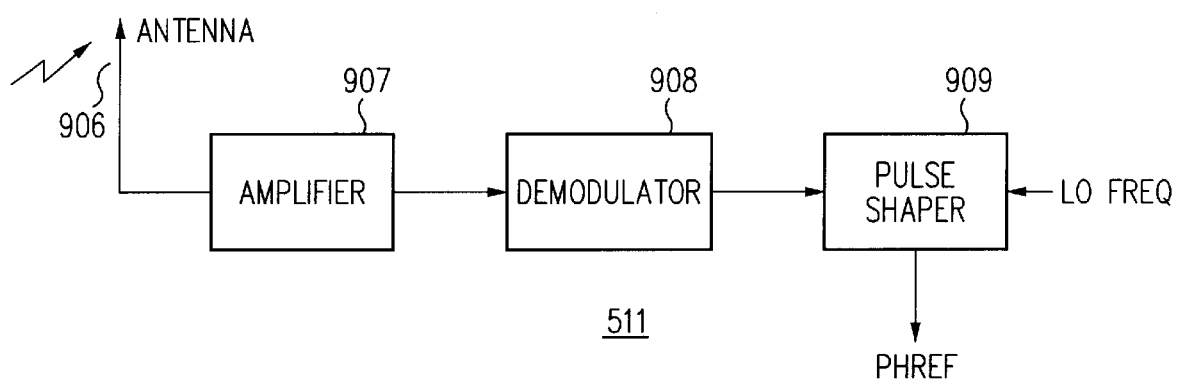
FIG. 9B shows a block diagram of a receiver that can be included in a line locator for receiving signals from a transmitter as shown in FIG. 9A.

FIG. 9B shows a PHREF receiving section 511 of line locator 500 (FIG. 5). Receiving section 511 includes antenna 906, amplifier 907, demodulator 908 and pulse shaper 909. The modulated PHREF signal is received at antenna 906 (or alternatively by a receiving terminal), amplified in amplifier 907, demodulated in demodulator 908, and converted to the PHREF signal in pulse shaper 909. In one embodiment, pulse shaper 909 mixes the output signal from demodulator 908 with the LO FREQ signal to create a signal having beat frequency IF and, with the use of a zero crossing detector, outputs a pulse train having frequency equal to the IF frequency.

In other embodiments, the phase reference signal PHREF is generated internally to line locator 500, usually based on the output signal of bottom sensor 303 or top sensor 304. The output signals of left sensor 301 or right sensor 302 are not used because critical polarity information is lost with their use as sources for the PHREF signal. However, the output signal from a field sensor 305 (see FIG. 3) may provide a phase reference signal, provided that field sensor 305 is oriented so that the polarity of the magnitude of its output signal does not change when field sensor 305 is passed over line 4.

Figure 10:
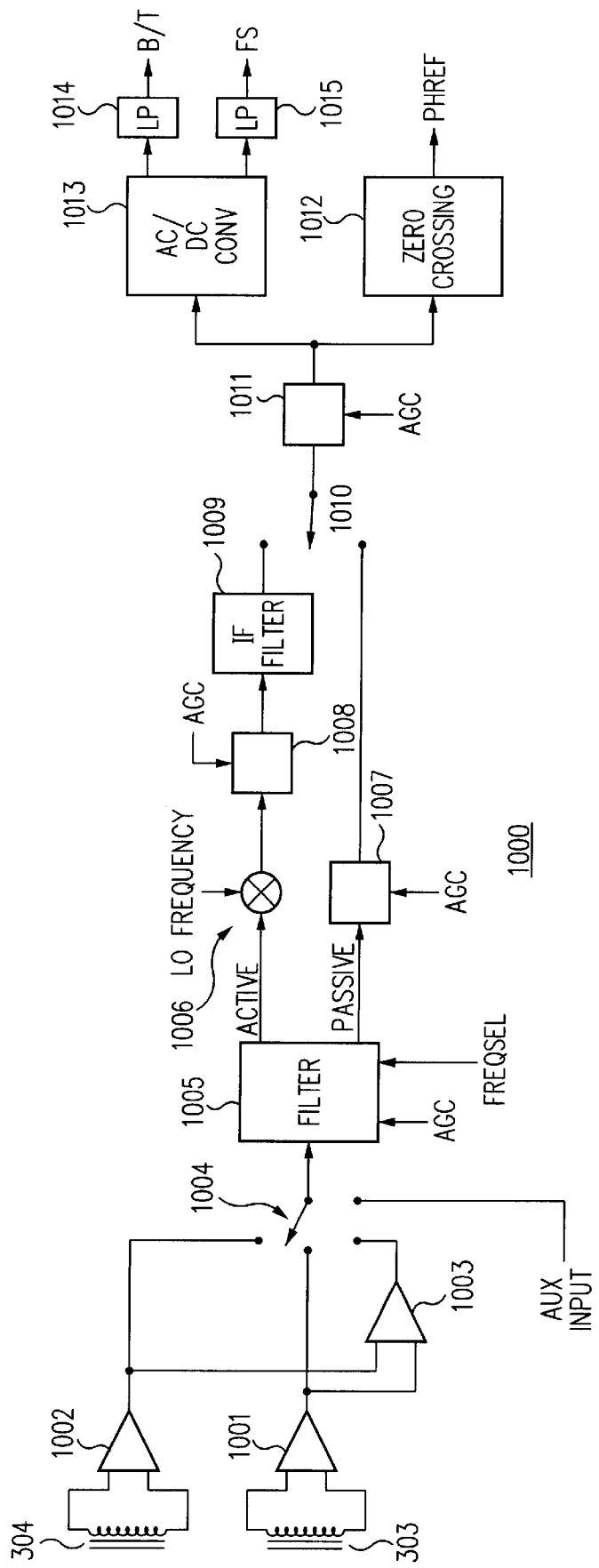
FIG. 10 shows a block diagram of a circuit for processing the output signals of the top sensor and the bottom sensor of the line locator shown in FIG. 5.
Figure 12M:
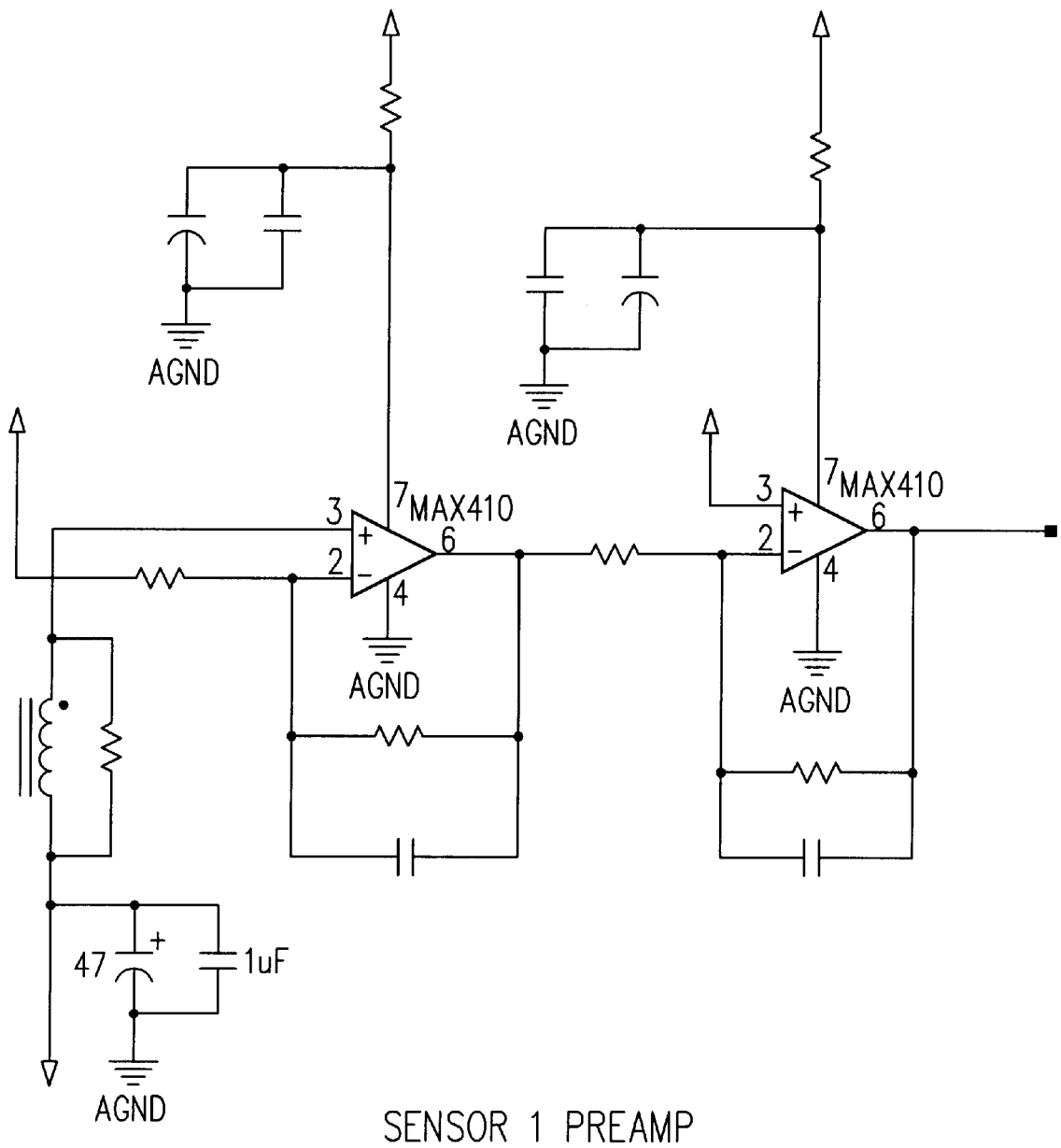
Figure 12N:
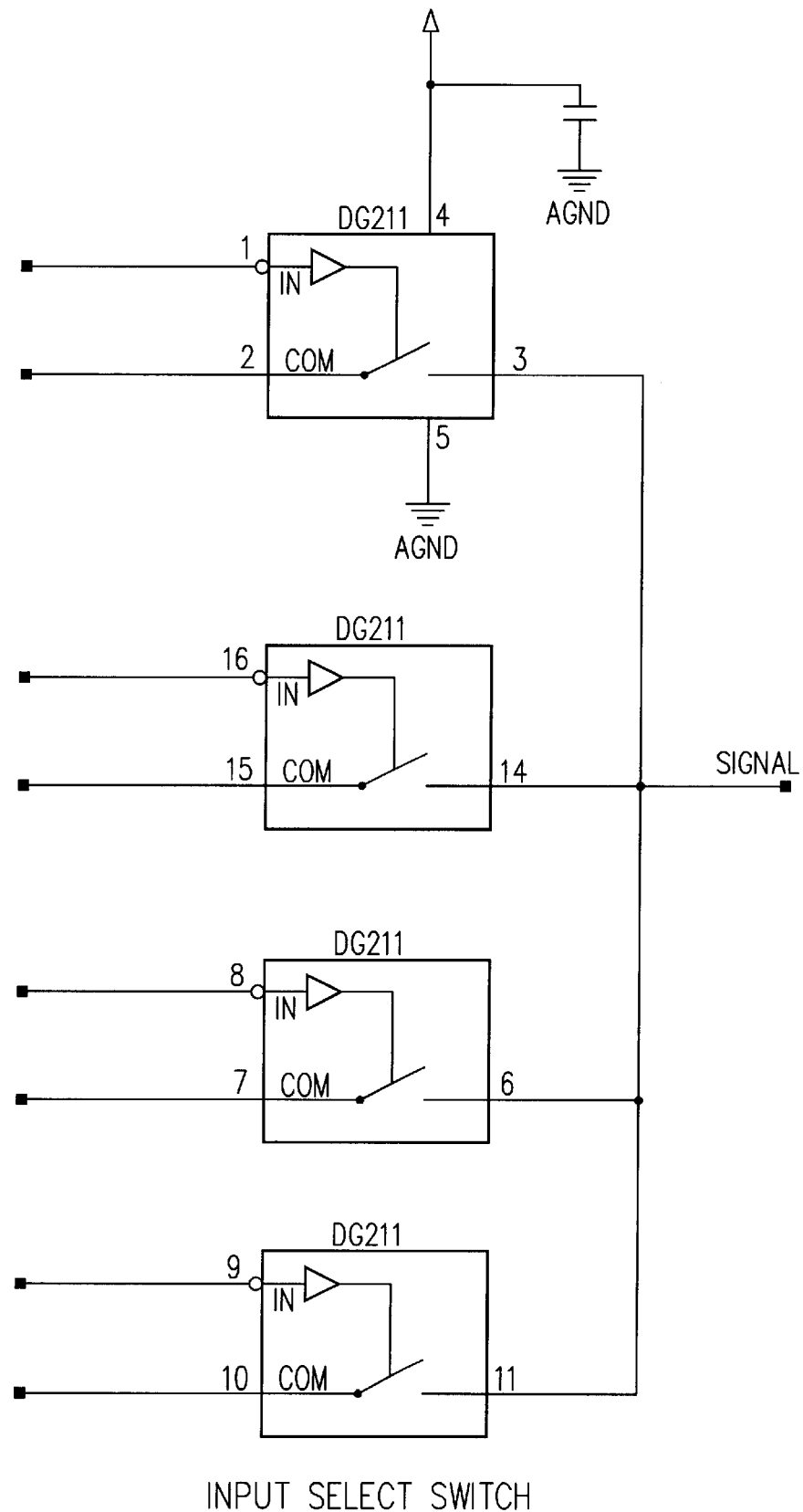
Figure 120:
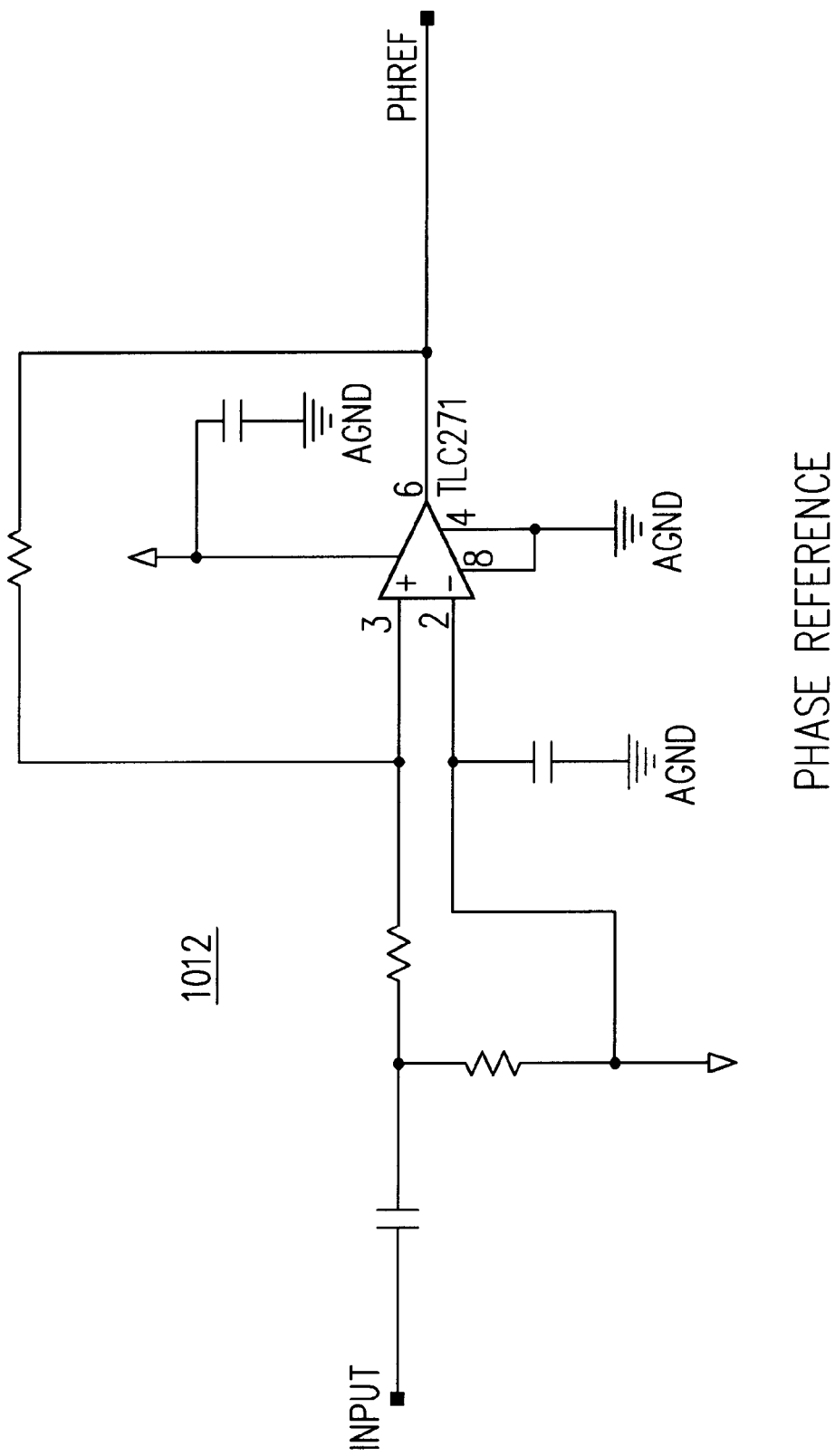

FIG. 10 shows a circuit for receiving output signals from top sensor 304 and bottom sensor 303 (see FIG. 5) that can be used in line locator 500. Processed output signals from top sensor 304 and bottom sensor 303 can be used to generate the AGC signal, the PHREF signal and field strength signals that can be used to compute the depth of line 4 (FIG. 5). In FIG. 10, the output signals from top sensor 304 and bottom sensor 303 are amplified in preamplifiers 1002 and 1001, respectively. Difference amplifier 1003 amplifies the difference between the output signals of preamplifiers 1002 and 1001. A switch 1004, which can be controlled by microcontroller 800 or by an operator, selects one of the output signals from preamplifier 1002, the output signal from preamplifier 1001, the output signal from difference amplifier 1003, or an auxiliary input. The auxiliary input setting is used to process output signals from magnetic field sensors that are external to the line locator, such as sensor 512 in FIG. 5. Difference amplifier 1003 is utilized when line locator 500 is operated to locate power lines. In that case, the output signal from top sensor 304 is subtracted from the output signal from bottom sensor 303 to correct for ambient 50/60 Hz magnetic fields, which have the same field strength at both top sensor 304 and bottom sensor 303. Active frequency operation and passive RF operation can utilize output signals from either of top sensor 304 or bottom sensor 303. FIG. 12M shows a circuit including a sensor and amplifier such as sensor 303 and preamp 1001 or sensor 304 and preamp 1002 of FIG. 10. FIG. 12N shows a selector switch such as switch 1004.

The output signal from switch 1004 in FIG. 10 is filtered in filter 1005. Filter 1005 can be any of the filters previously discussed, such as that shown in FIG. 7B. Filter 1005 can also output active output signals separately from passive output signals.

The active signal from filter 1005 is mixed with the LO FREQ signal from local oscillator 805 (see FIG. 8). AGC amplifier 1008 has a gain determined by the AGC signal. The active signal is then filtered in IF filter 1009. IF filter 1009 can be a filter as shown in FIG. 12J. In FIG. 10, the passive signal is received in AGC amplifier 1007. Switch 1010, which can be controlled by controller 800 or by an operator and is related to the FREQ SEL signal, selects either the active signal from IF filter 1009 or the passive signal from AGC amplifier 1007. An embodiment of switch 1010 is shown in FIG. 12K. In FIG. 10, the output signal from switch 1010 is received in AGC amplifier 1011, an embodiment of which is shown in FIG. 12D.

In FIG. 10, zero crossing 1012 receives the output signal from AGC amplifier 1011 and, by detecting the zero crossing of the signal, outputs the phase reference signal (PHREF). An embodiment of zero crossing 1012 is shown in FIG. 12O The PHREF signal from zero crossing 1012, as shown in FIG. 12O, is a pulse train where each pulse has duration 50% of the IF frequency and a frequency equal to IF frequency.

Figure 12P:
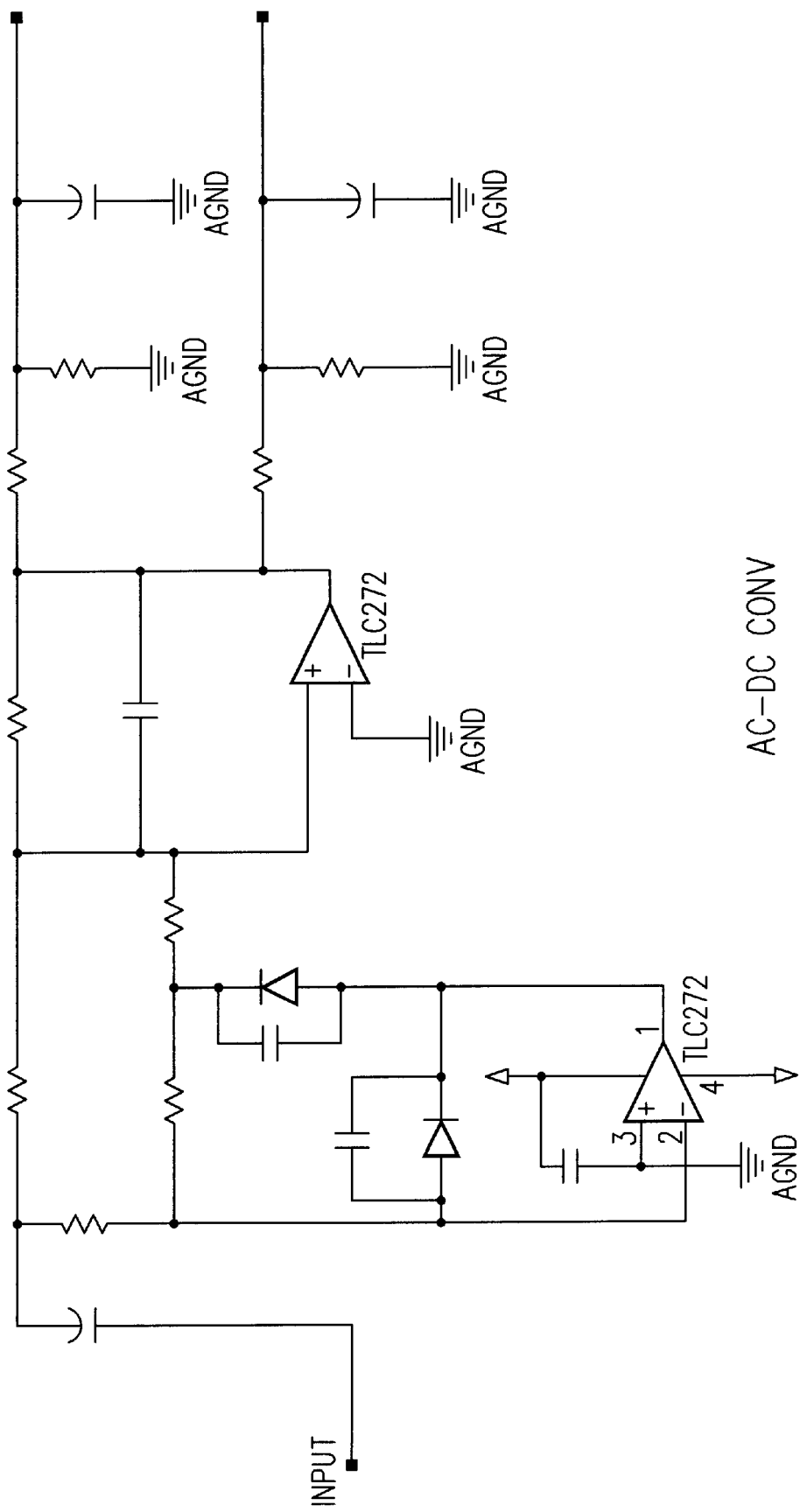

In FIG. 10, the output signal from AGC amplifier 1011 is also converted to two DC signals in AC/DC converter 1013. An embodiment of an AC/DC converter 1013 is shown in FIG. 12P. A bottom/top (B/T) signal, and a field strength (FS) signal are then filtered in low pass filters 1014 and 1015, respectively, and received in A/D converter 808 of microcontroller 800 (FIG. 8). The B/T signal and the FS signal differ in the amount of filtering performed in filters 1014 and 1015, with the B/T signal being more extensively filtered than the FS signal. The B/T signal is more stable and better used for further calculations in microprocessor 800 (FIG. 8) while the FS signal is suitable for a field strength display.

With the B/T signal from both bottom sensor 303 and top sensor 304, microcontroller 801 can determine the depth of line 4 (see FIG. 5). The depth is related to the difference in field strength between top sensor 304 and bottom sensor 303. Once the depth of line 4 is known, the actual left or right location of line locator 500 with respect to line 4 can be determined.

In some embodiments of the invention, the AGC signal is determined by an analog circuit directly from either bottom sensor 303 or top sensor 304. A method of determining the AGC signal from top sensor 304 is given in copending application "AGC Control for a Line Locator," U.S. Pat. No. 6,130,539, by Stevan Polak, having the same filing date and being assigned to the same assignee as this invention, herein incorporated by reference in its entirety.

Figure 11A:
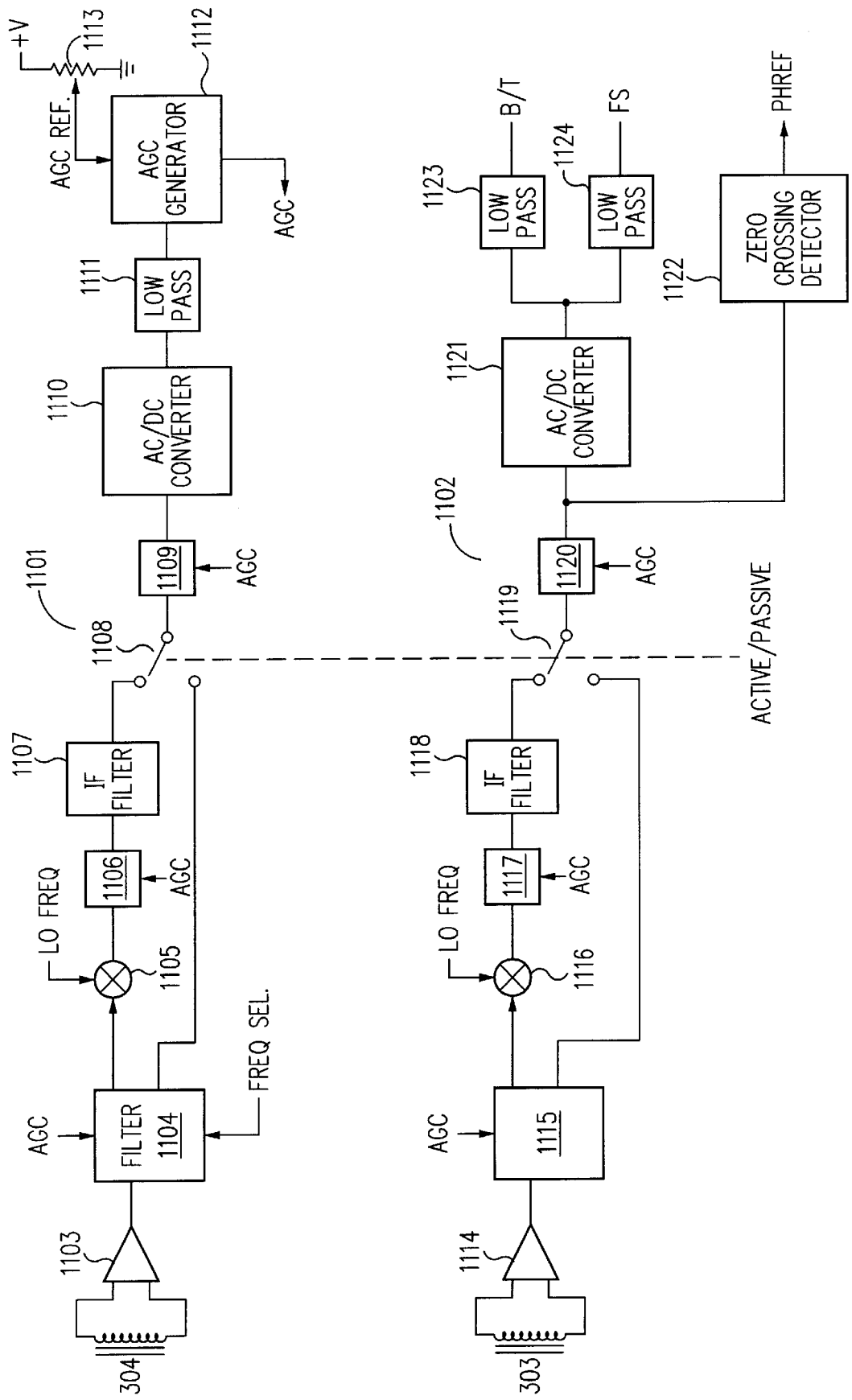
FIG. 11A shows a block diagram of a circuit for obtaining the AGC signal and the PHREF signal from a pair of sensors according to the present invention.

FIG. 11A shows a block diagram of a circuit utilizing top sensor 304 (FIG. 5) and bottom sensor 303 in order to obtain an AGC signal and a PHREF signal without microprocessor controller 800. The circuit includes two similar channels, a reference channel 1101 and an observed channel 1102. Although in FIG. 11, reference channel 1101 is shown to include top sensor 304 and observed channel 303 is shown to include bottom sensor 303, the sensors can be reversed. The AGC signal is generated in reference channel 1101 and the PHREF signal is generated in observed channel 1102 along with a B/T signal and an FS signal. Alternatively, the PHREF signal can also be determined in reference channel 1101.

In reference channel 1101, the output signal from top sensor 304 is amplified in preamp 1103 and filtered in filter 1104. Filter 1104 can be any of the filters previously discussed, such as, for example, the filter shown in FIG. 7B. The active output signal from filter 1104 is summed with the LO FREQ signal in mixer 1105 and amplified in AGC amplifier 1106. The output signal from AGC amplifier 1106 is filtered in IF filter 1107.

Figure 1:
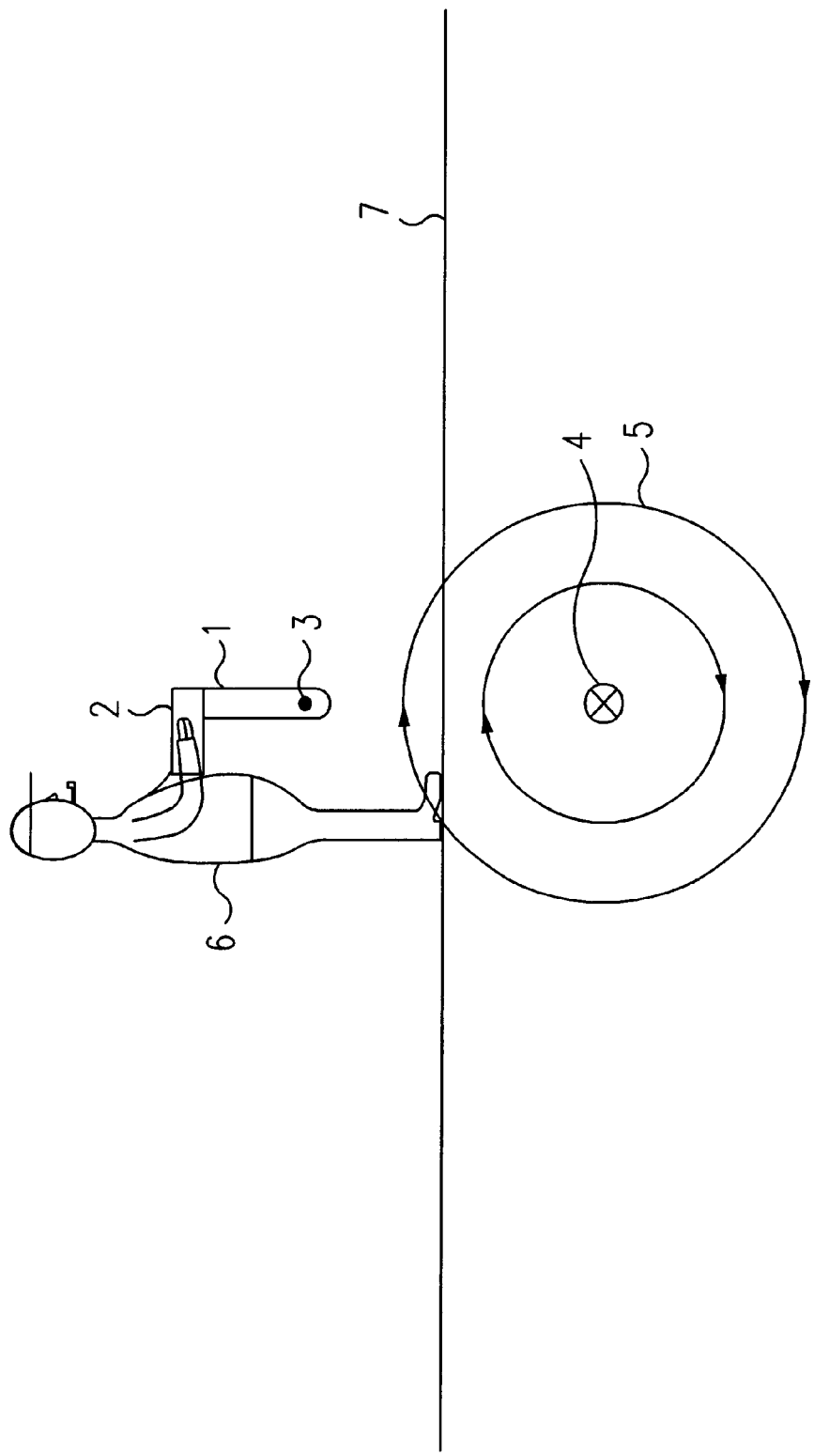
FIG. 1 shows a diagram of a single-sensor line locator as used by an operator to locate an underground conduit.
Figure 2A:
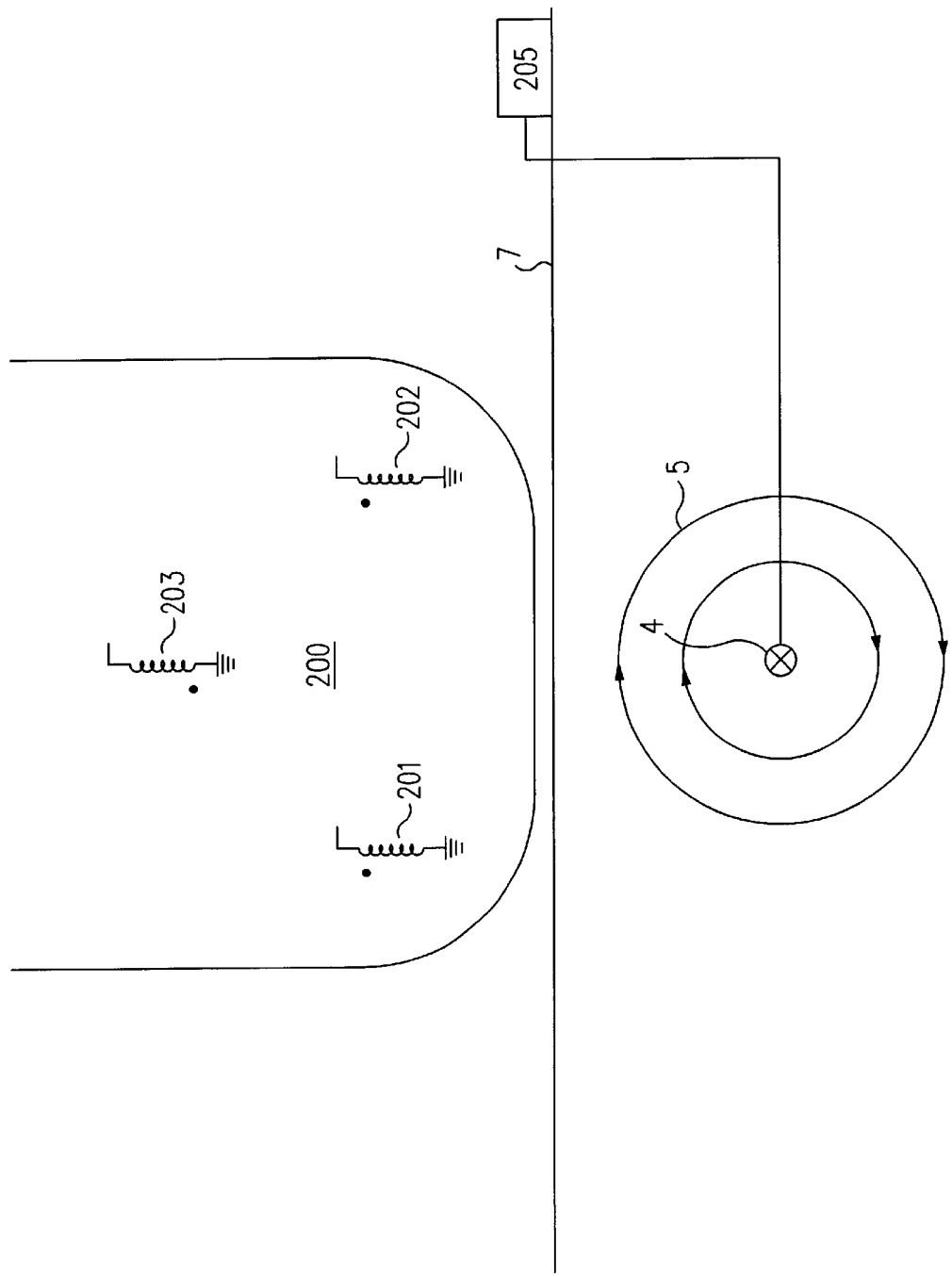
FIG. 2A shows a diagram of a line locator having a left sensor, a right sensor, and a center sensor where each of the sensors are vertically oriented.
Figure 2B:
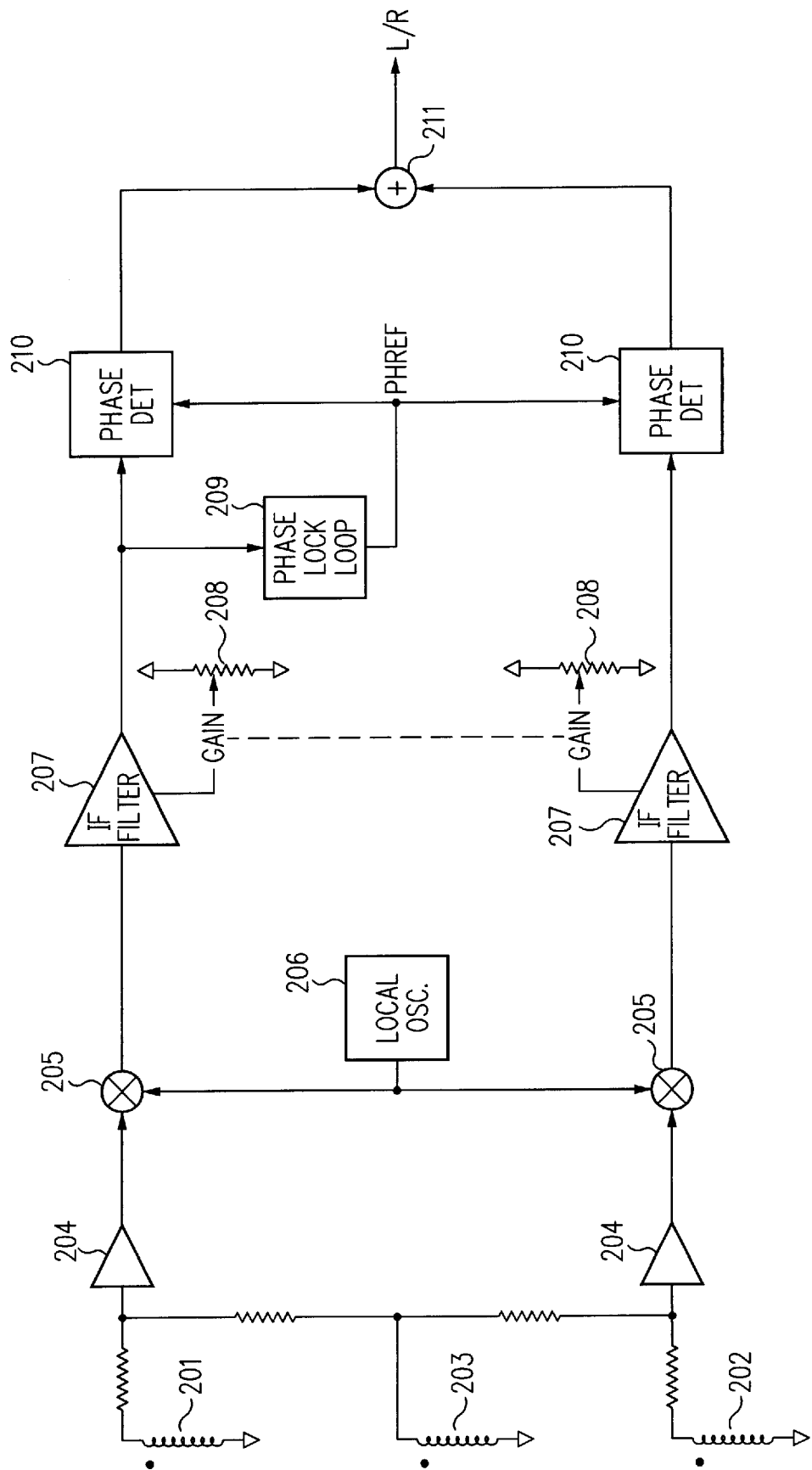
FIG. 2B shows a block diagram of signal processing circuitry for the line locator shown in FIG. 2A.

Switch 1108 selects the active signal channel or the passive signal from filter 1104 in response to an active/passive signal. The output signal from switch 1108 is amplified in AGC amplifier 1109. AC/DC converter 1110 converts the output signal from AGC amplifier 1109 into a DC signal which is filtered in low pass filter 1111 before being received by AGC generator 1112. AGC generator 1112 outputs the AGC signal in response to a comparison between an AGC reference voltage and the output signal from low pass filter 1111. The AGC reference voltage in FIG. 11 is determined by operator controlled setting 1113, but could be determined by a separate controller. An embodiment of an AGC generator is shown in FIG. 1B, where the AGC generator 1112 is a comparator.

In a substantially similar observed channel 1102, the output signal from bottom sensor 303 is amplified in preamp 1114 and filtered in filter 1115. Filter 1115 is one of the types of filters that have been previously discussed. The active frequency output from filter 1115 is mixed with the LO FREQ signal in mixer 1116, amplified in AGC amplifier 1117 and filtered in IF filter 1118. Switch 1119 selects the active frequency channel or the passive frequency output from filter 1115. The output signal from switch 1119 is amplified by AGC amplifier 1120. Zero crossing detector 1122 outputs the PHREF signal in response to the output signal from AGC amplifier 1120. The PHREF signal, then, is used in phase detector 709 of the left/right circuit shown in FIG. 7A.

Additionally, the output signal from AGC amplifier 1120 is converted to a DC signal by AC/DC converter 1121. The output signal from AC/DC converter 1121 is filtered by low pass filter 1123 to generate a B/T signal and filtered by low pass filter 1124 to generate a FS signal. Generally, the FS signal is not as filtered as the B/T signal so that the FS signal is useful for displaying a field strength but the B/T signal is better for undertaking further calculations in, for example, a microprocessor.

In one embodiment, microprocessor 800 includes software to operate a line locator and display results. A main routine includes routines for displaying the field strengths measured by the signal processing circuits (i.e., the L/R signal, the B/T signal and the FS signal) and for calculating an AGC signal. FIG. 13 shows a routine for displaying the field strengths and FIG. 14 shows a routine for calculating the AGC signal. A complete flow chart of software code according to one embodiment of the invention is shown, along with an embodiment of the software code itself, in Microfiche Appendix A.

FIG. 13 shows a flow chart for software that can be executed by controller 800 (FIG. 8) to display parameters for left/right line locator 500 (FIG. 5). Routine 1300 reads from A/D converter 808 (FIG. 8) the L/R signal originating from processing circuit 700 (FIG. 7), the FS signal originating from bottom/top circuit 1000 (FIG. 10) and the B/T signal originating from bottom/top circuit 1000 (FIG. 10) at start 1301 (FIG. 13). In block 1302, the FS signal is displayed numerically on display 812 (FIG. 8). If test block 1303 determines that the input is an auxiliary input (see switch 1004 of FIG. 10A) then the routine 1300 moves to block 1304 where specific parameters for displaying auxiliary inputs are computed. These parameters include the field strength from the input, tonal qualities for a speaker, or other parameters for displaying the B/T signal resulting from the auxiliary input. For example, in one embodiment a bar display is used having 51 bars ranging from −25 to 25. One set of parameters would identify which of the bars are illuminated in response to a particular field strength. The auxiliary input parameters are displayed on display 812 in block 1305. After displaying the auxiliary inputs, routine 1300 exits at return 1314.

If there is no auxiliary input, routine 1300 checks whether or not the operating frequency of the line locator is a passive frequency or an active frequency in block 1306. This test can be accomplished by checking the FREQ SEL signal for active or passive frequencies. If the line locator is operating in passive frequencies, then routine 1300 moves to block 1307 and calculates the display parameters for passive frequency display and displays the results on display 812 in step 1308 and exits at return 1314. Different display characteristics for active, passive and auxiliary display (i.e., different tonal qualities or coloration of bar meter outputs) allow the operator to immediately asses the state of the line locator from the display.

If there is no auxiliary input and the line locator is operating in active mode, then optionally the display parameters are calculated for the field strength and displayed in display 812 in step 1309.

In step 1310, the field strength (i.e., the FS signal but field strength could also be taken as the B/T signal) is compared against a lower threshold. If the field strength is less than the lower threshold, then a moving average of the L/R signal is computed in block 1311. If the field strength is greater than the lower threshold, then the calculation of the moving average is skipped and the L/R signal is displayed directly. The display parameters for displaying the L/R signal are computed in 1312 and displayed on display 812 in step 1313. Routine 1300 then exits at return 1314.

FIG. 14 shows a flow chart of a routine 1400 for calculating the AGC signal digitally. A field strength and the AGC signal is inputted at step 1400. The field strength can be any signal (i.e., the B/T signal, the FS signal or the L/R signal). The field strength is compared with an upper threshold value in block 1401. If the field strength is greater than an upper threshold value, gain decrement is enabled in block 1402. If the field strength is less than the upper threshold, then block 1403 compares the field strength with a lower threshold. If the field strength is less than the lower threshold, the gain increment is enabled in block 1404. The lower and upper thresholds are set so that the field strength is held to be approximately a constant.

In block 1405, a new AGC signal is calculated based on a negative feedback estimation. The field strength is compared with a target field strength to calculate the new AGC signal. In some embodiments, the new AGC signal will be the old AGC signal corrected by a proportion of the difference between the field strength and the target field strength, the proportionality constant controlling how fast the AGC signal converges. In another embodiment, the AGC signal is adjusted based on a model of field strength as a function of AGC signal.

One embodiment of the left/right line locator combines the circuit shown in FIG. 11 with the circuits shown in FIGS. 7A, 7B and 7C. The resulting line locator does not use a microprocessor circuit such as that shown in FIG. 8. Other embodiments of the left/right line locator would incorporate the circuits shown in FIG. 9A and 9B so that the PHREF signal is transmitted from transmitter 510 and not generated by zero crossing detector 1122 of FIG. 11A. An embodiment of the software code executed by controller 800 to control a left/right line locator that includes the embodiments of circuit diagrams shown in FIGS. 7A and 10A is shown in Microfiche Appendix A.

Other embodiments of this invention will be obvious to ore of ordinary skill in the art in light of the above examples. Obvious variations include reversing the polarity of one of the left sensor or the right sensor so that the difference in the output signals from the left sensor and the right sensor instead of the sum of these signals is taken. Other variations are also obvious to one skilled in the art and are included within the scope of this invention. As such, this invention is limited only by the following claims.

We claim:

1. A line locator for locating an elongated concealed conductor that emits a magnetic field at an operating frequency, comprising:

an input circuit including a left sensor, a right sensor and a convolution amplifier coupled to the left sensor and the right sensor, the left sensor and the right sensor detecting the magnetic field;

a single channel signal processing circuit coupled to the input circuit and outputting a left/right signal, wherein the signal processing circuit includes a filter coupled to receive the output signal from the input circuit;

a phase detector coupled to the filter, the phase detector receiving a PHREF signal from a PHREF source; and at least one AGC amplifier coupled between the filter and the phase detector, the AGC amplifier receiving an AGC signal from an AGC source; and wherein the convolution amplifier provides an output signal to the signal processing circuit that is proportional to a convolution of an output signal of the left sensor and an output signal from the right sensor.

2. The line locator of claim 1, wherein the filter includes at least one filter path, the at least one filter path including a bandpass filter chosen from the set consisting of 9.8 kHz, 82 kHz, 982 Hz, 35 kHz, 50 Hz, and 60 Hz.

3. The line locator of claim 1, wherein the filter includes a filter path having an RF filter.

4. The line locator of claim 1, wherein the filter includes a filter path having an active filter.

5. The line locator of claim 1, wherein the filter is a digital filter.

6. The line locator of claim 1, wherein the filter includes at least one filter path, each of the at least one filter path including an AGC amplifier that receives the AGC signal from the AGC source.

7. The line locator of claim 1, wherein the filter includes a plurality of filter paths, each of the plurality of filter paths including a specific filter and wherein an operator chooses the specific filter based on the operating frequency of the line locator.

8. The line locator of claim 1, wherein the PHREF source includes a sensor;

a filter coupled to receive the output signal from the sensor; and a zero-crossing detector coupled to receive an output signal from the filter and that outputs an output signal comprising a pulse train having a frequency equal to that of an input signal to the zero-crossing detector.

9. The line locator of claim 8, further including a mixer coupled to receive an output signal from the filter, the mixer adding a LO FREQ signal with the output signal from the filter and outputting a signal having a frequency equal to an IF frequency; and wherein the output signal has a frequency equal to the IF frequency.

10. The line locator of claim 1, wherein the PHREF source includes a receiver that receives a signal from an external, transmitter, the external transmitter providing an active frequency to the elongated concealed conductor; wherein the receiver outputs the PHREF signal in response to the signal received from the external transmitter.

11. The line locator of claim 1, wherein the AGC source includes a sensor;

a filter coupled to receive an output signal from the sensor;

at least one AGC amplifier; and an AGC generator coupled to receive an output signal from the filter that provides an AGC signal to the AGC amplifier to keep the output signal from the filter a constant.

12. The line locator of claim 1, further including a top sensor;

a bottom sensor; and a bottom/top processing circuit coupled to receive signals from the top sensor and the bottom sensor, the processing circuit providing a field strength signal in response to signals from either of top sensor or the bottom sensor.

13. The line locator of claim 12, wherein the processing circuit further provides a PHREF signal.

14. The line locator of claim 12, wherein the processing circuit further provides an AGC signal.

15. The line locator of claim 12, wherein the processing circuit includes
- a reference channel coupled to the top sensor, the reference channel providing an AGC signal; and
- an observed channel coupled to the bottom sensor, the observed channel providing a field strength signal.

16. The line locator of claim 12, further including a microprocessor controller coupled to receives and displays the left/right signal and the field strength signal.

17. The line locator of claim 16, wherein the microprocessor controller further computes the depth of the elongated concealed conductor.

18. The line locator of claim 16, wherein the microprocessor controller further computes a calibrated lateral displacement of the line locator with respect to the elongated concealed conductor.

19. A method of detecting a concealed conductor that emits a magnetic field at an operating frequency, comprising:
- convoluting the output signals from a left sensor and a right sensor to generate a convoluted signal, the left sensor and the right sensor sensing the magnetic field;
- filtering the convoluted signal with a band-pass filter having center frequency equal to the operating frequency;
- generating a PHREF signal; and
- phase detecting the filtered convoluted signal using the PHREF signal in order to generate a left/right signal.

20. The method of claim 19, wherein the left sensor and the right sensor are vertically oriented and convoluting the output signals includes adding the output signals.

21. The method of claim 19, wherein the left sensor and the right sensor are horizontally oriented and convoluting the output signals includes taking the difference between the output signals.

22. The method of claim 19, further including
generating an AGC signal;
amplifying the convoluted signal and the filtered convoluted signal with an AGC amplifier, the AGC amplifier having a gain determined by the AGC signal.

23. The method of claim 22, wherein generating the AGC signal includes;
- measuring the field strength from a center sensor; and
- calculating the AGC signal in a microprocessor controller based on the field strength.

24. The method of claim 22, wherein generating the AGC signal includes:
- measuring a field strength using a reference sensor in a reference channel, the reference channel including at least one AGC amplifier;
- comparing the field strength with a reference field strength to determine the AGC signal.

25. The method of claim 19, wherein generating the PHREF signal includes:
- receiving a signal from a transmitter, the transmitter being coupled to the concealed conductor and exciting the concealed conductor into emitting the magnetic field of the operating frequency;
- converting the signal from the transmitter to the PHREF signal.

26. The method of claim 19, wherein generating the PHREF signal includes:
- detecting a magnetic field signal with a center sensor;
- mixing the magnetic field signal with a LO FREQ signal;
- filtering the mixed magnetic field signal with an IF filter; and
- producing the PHREF signal with a zero crossing detector.

* * * * *